(12) United States Patent
Hyun et al.

(10) Patent No.: US 10,372,541 B2
(45) Date of Patent: Aug. 6, 2019

(54) STORAGE DEVICE STORING DATA USING RAID

(71) Applicant: SAMSUNG ELECTRONICS CO., LTD., Suwon-si, Gyeonggi-Do (KR)

(72) Inventors: Jee-Seok Hyun, Hwaseong-si (KR); Keonsoo Ha, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 104 days.

(21) Appl. No.: 15/616,268

(22) Filed: Jun. 7, 2017

(65) Prior Publication Data
US 2018/0101441 A1 Apr. 12, 2018

(30) Foreign Application Priority Data
Oct. 12, 2016 (KR) .................. 10-2016-0132205

(51) Int. Cl.
*G06F 11/00* (2006.01)
*G06F 11/10* (2006.01)
*G06F 3/06* (2006.01)

(52) U.S. Cl.
CPC .......... *G06F 11/1096* (2013.01); *G06F 3/061* (2013.01); *G06F 3/0619* (2013.01); *G06F 3/0656* (2013.01); *G06F 3/0665* (2013.01); *G06F 3/0689* (2013.01)

(58) Field of Classification Search
CPC ...... G06F 11/10; G06F 11/1076; G06F 17/30; G06F 3/06; G06F 3/061; G06F 3/0619; G06F 3/0656; G06F 3/0689; G06F 11/1096

USPC ........ 714/752, 758, 763, 766, 770, 800–805
See application file for complete search history.

(56) References Cited

U.S. PATENT DOCUMENTS

| | | |
|---|---|---|
| 5,883,909 A * | 3/1999 | DeKoning .............. G06F 11/10 714/800 |
| 6,112,255 A | 8/2000 | Dunn et al. |
| 7,290,199 B2 | 10/2007 | Forhan et al. |
| 7,636,814 B1 | 12/2009 | Karr et al. |
| 8,775,868 B2 | 7/2014 | Colgrove et al. |
| 8,886,880 B2 | 11/2014 | Barrell et al. |
| 8,943,357 B2 | 1/2015 | Atzmony |
| 9,122,399 B2 | 9/2015 | Nishina et al. |
| 9,891,989 B2 * | 2/2018 | Kawamura ........... G06F 3/0619 |
| 9,921,914 B2 * | 3/2018 | Ptak ................... G06F 11/1096 |
| 2003/0236943 A1 | 12/2003 | Delaney |

(Continued)

*Primary Examiner* — Albert Decady
*Assistant Examiner* — Osman M Alshack
(74) *Attorney, Agent, or Firm* — F. Chau & Associates, LLC

(57) ABSTRACT

A storage device includes a plurality of first memories, a controller, and a second memory. The controller controls the first memories such that first and second data chunks associated with target data are distributively stored in the plurality of first memories. The controller generates a first intermediate parity using the first data chunk, which is processed immediately before the second data chunk. When the second data chunk is not a data chunk which is processed last in connection with the target data and the first intermediate parity is buffered in the second memory, the controller generates a second intermediate parity using the first intermediate parity buffered in the second memory and the second data chunk, and outputs the second intermediate parity to the second memory to be buffered.

17 Claims, 21 Drawing Sheets

(56) References Cited

U.S. PATENT DOCUMENTS

| | | | | |
|---|---|---|---|---|
| 2005/0278612 | A1* | 12/2005 | Edirisooriya | G06F 11/1076 714/800 |
| 2013/0290613 | A1* | 10/2013 | Uehara | G06F 3/0688 711/103 |
| 2013/0290773 | A1* | 10/2013 | Yoshihara | G06F 12/0246 714/6.21 |
| 2014/0317340 | A1* | 10/2014 | Nishina | G06F 3/0608 711/103 |
| 2016/0072529 | A1* | 3/2016 | Suzuki | H03M 13/2909 714/755 |
| 2016/0259687 | A1* | 9/2016 | Yoshihara | G06F 3/0619 |
| 2017/0017417 | A1* | 1/2017 | Chae | G06F 3/0619 |

\* cited by examiner

FIG. 6C

| | 1350a | 1350b | | 1331a | 1331b | | 1333b |
|---|---|---|---|---|---|---|---|
| t31 | D32 | P31 | | P22 | P12 | | |
| t32 | D32 | P31 | P12 | P22 | | | |
| t33 | D32 | | P12 | P22 | P31 | | |
| t34 | D32 | | P12 | P22 | P31 | | D32 $\oplus$ P31 = P32<br>(A)    (B) |
| t35 | | | P12 | P22 | P32 | | |
| t36 | D13 | | P12 | P22 | P32 | | |
| t37 | D13 | P22 | P12 | | P32 | | |
| t38 | D13 | P22 | | P12 | P32 | | |
| t39 | D13 | P22 | | P12 | P32 | | D13 $\oplus$ P12 = P13<br>(A)    (B) |
| t40 | | P22 | | P13 | P32 | | |
| t41 | | P22 | | | P32 | | |

FIG. 12C

| 1350a | 1350b | 1331a | 1331b | 1333b |
|-------|-------|-------|-------|-------| t114 — D13 P12 P22 — P32 t115 — D13 P12 P22 — P32 — D13 ⊕ P12 = P13  (A)  (E)

t116 — P22 — P13 P32 t117 — P22 — P32 t118 — D23 P22 — P32 t119 — D23 P22 — P32 — D23 ⊕ P22 = P23  (A)  (E)

t120 — P23 P32 t121 — P32 t122 — D33 — P32 t123 — D33 — P32 — D33 ⊕ P32 = P33  (A)  (B)

t124 — P33 t125

STORAGE DEVICE STORING DATA USING RAID

CROSS-REFERENCE TO RELATED APPLICATION

This U.S. non-provisional patent application claims priority under 35 U.S.C. § 119 to Korean Patent Application No. 10-2016-0132205, filed on Oct. 12, 2016 in the Korean Intellectual Property Office, the disclosure of which is incorporated by reference herein in its entirety.

TECHNICAL FIELD

Exemplary embodiments of the inventive concept relate to an electronic device, and more particularly, to configurations and operations of a storage device storing data.

DISCUSSION OF RELATED ART

A storage device is an electronic device for storing data for a user. The storage device provides a storage service according to operations of various electronic circuits included therein, such as a memory device, a controller, and/or the like. To this end, the storage device processes signals/data received from a host device, and performs various operations.

Various methodologies have been proposed to store data in a storage device stably and reliably. Redundant array of independent disks (RAID) technology is one of such methodologies. RAID technology is widely employed in storage systems including a plurality of storage devices or a plurality of computing devices, and may be employed even in a single storage device.

With RAID, data is managed in units of stripes. One stripe is divided into a plurality of data chunks, and the divided data chunks are distributively stored in a plurality of separate storage areas. Further, a parity is generated based on the divided data chunks, and the generated parity is stored in one of the storage areas. When some of the data chunks are lost or damaged, the parity is used to recover or restore the lost or damaged data chunk(s).

When RAID is employed in a storage device or system, various operations are performed to divide one stripe into a plurality of data chunks or to generate parity. As an amount of data increases, load and latency in performing such operations increase, and this may cause degradation of performance of the storage device or system.

SUMMARY

According to an exemplary embodiment of the inventive concept, a storage device includes a plurality of first memories, a controller, and a second memory. The first memories may distributively store first and second data chunks which are associated with target data. The controller may control the plurality of first memories such that the first and second data chunks are distributively stored. The second memory may buffer the first and second data chunks. The controller may generate a first intermediate parity using the first data chunk, which is processed immediately before the second data chunk in connection with the target data. When the second data chunk is not a data chunk which is processed last in connection with the target data and the first intermediate parity is buffered in the second memory, the controller may generate a second intermediate parity using the buffered first intermediate parity and the second data chunk, and may output the second intermediate parity to the second memory to be buffered.

According to an exemplary embodiment of the inventive concept, a storage device includes a plurality of first memories, a controller, and a second memory. The first memories may distributively store first and second data chunks which are associated with target data. The controller may control the plurality of first memories such that the first and second data chunks are distributively stored. The second memory may buffer the first and second data chunks. The controller may generate a first intermediate parity using the first data chunk, which is processed immediately before the second data chunk in connection with the target data. When the first intermediate parity is buffered in the second memory, the controller may generate a second intermediate parity using the buffered first intermediate parity and the second data chunk.

According to an exemplary embodiment of the inventive concept, a method of storing data includes receiving a first data chunk divided from target data, determining that the first data chunk is not a first processed data chunk in connection with the target data, determining whether an intermediate parity associated with the target data is stored in a cache memory, generating a first parity using the received first data chunk and the intermediate parity from the cache memory when it is determined that the intermediate parity is stored in the cache memory, and generating the first parity using the received first data chunk and parity buffered in a buffer memory when it is determined that the intermediate parity is not stored in the cache memory.

BRIEF DESCRIPTION OF THE DRAWINGS

The above and other objects and features will become apparent by describing in detail exemplary embodiments thereof with reference to the accompanying drawings.

FIGS. 6A to 6D are diagrams for describing a process of storing data in the storage device of FIG. 5 according to an exemplary embodiment of the inventive concept.

FIGS. 12A to 12C are diagrams for describing a process of storing data in the storage device of FIG. 11 according to an exemplary embodiment of the inventive concept.

DETAILED DESCRIPTION OF THE EMBODIMENTS

Figure 1:
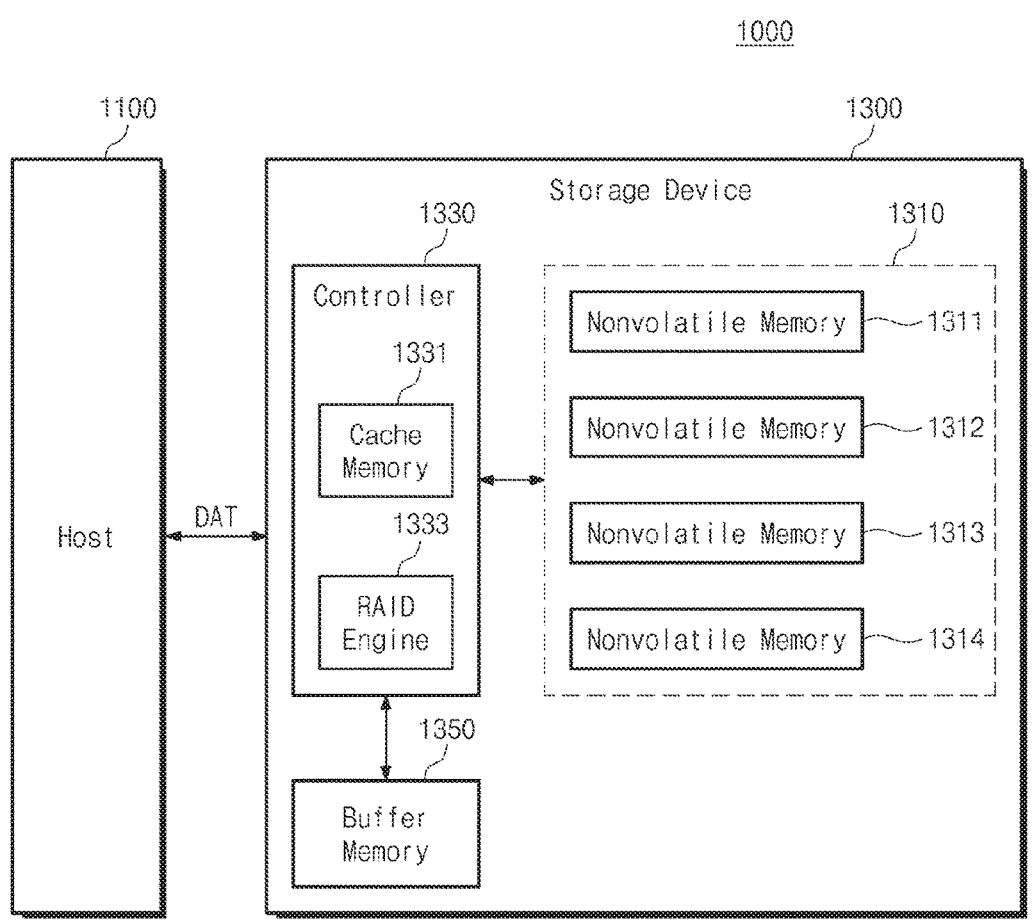
FIG. 1 is a block diagram illustrating an electronic system including a storage device according to an exemplary embodiment of the inventive concept.

Exemplary embodiments of the inventive concept will be described more fully hereinafter with reference to the accompanying drawings. Like reference numerals may refer to like elements throughout the accompanying drawings.

Exemplary embodiments of the inventive concept provide configurations and operations of a storage device or a storage system using RAID to prevent degradation of performance.

FIG. 1 is a block diagram illustrating an electronic system including a storage device according to an exemplary embodiment of the inventive concept. An electronic system 1000 may include a host 1100 and a storage device 1300.

The host 1100 may exchange data with the storage device 1300. The storage device 1300 may provide a storage service to the host 1100 in response to a command received from the host 1100.

For example, for a write operation, the host 1100 may provide the storage device 1300 with a write command and data DAT including write data. The storage device 1300 may store the write data included in the data DAT, in response to the write command. For a read operation, the host 1100 may provide a read command to the storage device 1300. The storage device 1300 may output the data DAT including read data to the host 1100, in response to the read command.

The host 1100 may be implemented to include one or more processor cores. For example, the host 1100 may include a general-purpose processor, a special-purpose processor, or an application processor. The host 1100 may be a processor itself, or may be an electronic device or system including processor(s).

The storage device 1300 may include a plurality of nonvolatile memories 1310, a controller 1330, and a buffer memory 1350.

The plurality of nonvolatile memories 1310 may include nonvolatile memories 1311, 1312, 1313, and 1314. Each of the nonvolatile memories 1311, 1312, 1313, and 1314 may store write data transmitted by the host 1100, or may output read data requested by the host 1100. To this end, each of the nonvolatile memories 1311, 1312, 1313, and 1314 may include memory area(s) for storing data. FIG. 1 illustrates four nonvolatile memories 1311, 1312, 1313, and 1314, but the inventive concept is not limited thereto, and the number of nonvolatile memories may be variously changed or modified.

For example, when each of the nonvolatile memories 1311, 1312, 1313, and 1314 includes a NAND-type flash memory, they may each include a memory cell array formed along a plurality of word lines and a plurality of bit lines. However, the inventive concept is not limited thereto. For example, each of the nonvolatile memories 1311, 1312, 1313, and 1314 may include at least one of various nonvolatile memories, such as a phase-change random access memory (PRAM), a magneto-resistive RAM (MRAM), a resistive RAM (ReRAM), a ferro-electric RAM (FRAM), and/or the like. A configuration of each of the nonvolatile memories 1311, 1312, 1313, and 1314 may be variously changed or modified.

Although the nonvolatile memories 1311, 1312, 1313, and 1314 are described in the present exemplary embodiment, some or all of the nonvolatile memories 1311, 1312, 1313, and 1314 may be replaced with a volatile memory, such as a static RAM (SRAM), a dynamic RAM (DRAM), a synchronous DRAM (SDRAM), and/or the like. Use of nonvolatile memories is merely an example, and the inventive concept is not limited thereto.

The controller 1330 may control overall operations of the storage device 1300. For example, the controller 1330 may schedule operations of the nonvolatile memories 1311, 1312, 1313, and 1314, or may encode and decode signals/data processed in the storage device 1300.

The controller 1330 may include a hardware configuration, a software configuration, or a hybrid configuration thereof to perform various operations that will be described below. For example, the controller 1330 may include a special-purpose hardware circuit configured to perform a specific operation. Additionally or alternatively, the controller 1330 may include one or more processor cores capable of executing an instruction set of a program code configured to perform a specific operation.

The controller 1330 may include a cache memory 1331. The cache memory 1331 may store data used in operations of the controller 1330. To this end, the cache memory 1331 may include one or more of nonvolatile/volatile memories.

The controller 1330 may include a redundant array of independent disk (RAID) engine 1333. The RAID engine 1333 may be employed to store data in the nonvolatile memories 1311, 1312, 1313, and 1314, using a RAID configuration. The RAID configuration will be described below with reference to FIG. 2.

The RAID engine 1333 and each of the components of the RAID engine 1333 may include a hardware configuration, a software configuration, or a hybrid configuration thereof to perform various operations that will be described below with reference to FIGS. 2 to 13. For example, the RAID engine 1333 and each of the components of the RAID engine 1333 may include a special-purpose hardware circuit configured to perform a specific operation. Additionally or alternatively, the RAID engine 1333 and each of the components of the RAID engine 1333 may include one or more processor cores capable of executing an instruction set of a program code configured to perform a specific operation.

The buffer memory 1350 may buffer data used in operations of the storage device 1300. To this end, the buffer memory 1350 may include one or more of nonvolatile/volatile memories.

In the present exemplary embodiment, the plurality of nonvolatile memories 1310 may be referred to as a plurality of first memories. Further, the buffer memory 1350 located outside the controller 1330 may be referred to as a second memory, and the cache memory 1331 located inside the controller 1330 may be referred to as a third memory. According to exemplary embodiments of the inventive concept, the cache memory 1331 may operate at a higher speed than the buffer memory 1350 to provide high performance of the controller 1330 (e.g., the cache memory 1331 may include an SRAM). According to exemplary embodiments of the inventive concept, the buffer memory 1350 may have a larger capacity than the cache memory 1331 to manage overall data flow of the storage device 1300 (e.g., the buffer memory 1350 may include a DRAM). However, these are only examples, and the inventive concept is not limited thereto.

According to exemplary embodiments of the inventive concept, the electronic system 1000 may be implemented by one single electronic device. For example, the electronic system 1000 may be one of various electronic devices, such as a home appliance, a desktop computer, a laptop computer, a tablet computer, a smart phone, a wearable device, a video game console, and/or the like, that includes the host 1100 and the storage device 1300. According to exemplary embodiments of the inventive concept, the electronic system 1000 may be implemented by a plurality of electronic devices. For example, the host 1100 and the storage device 1300 may be separate electronic devices, and may be locally or remotely connected to each other to implement the electronic system 1000.

Figure 2:
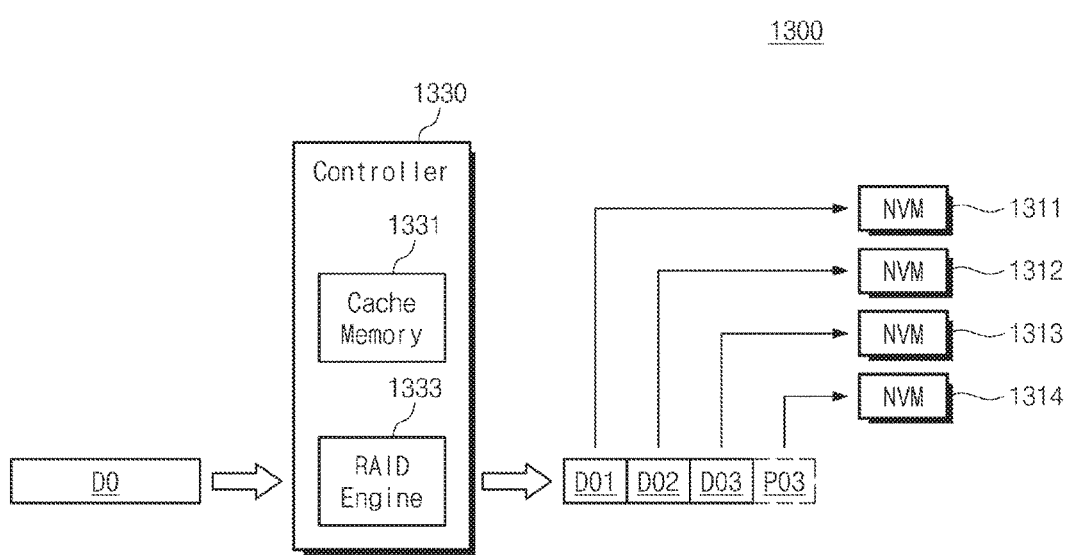
FIG. 2 is a diagram for describing a RAID configuration employed in the storage device of FIG. 1 according to an exemplary embodiment of the inventive concept.

FIG. 2 is a diagram for describing a RAID configuration employed in the storage device of FIG. 1 according to an exemplary embodiment of the inventive concept.

With the RAID configuration, data may be managed as stripes. For example, the storage device 1300 may receive data D0 from the host 1100. To facilitate better understanding, it will be assumed that each of the data D0 and other data that will be described below has a size corresponding to one stripe. However, the inventive concept is not limited to this assumption. For example, some pieces of data may have a size smaller than one stripe, or may have a size corresponding to a plurality of stripes.

One stripe may be divided into a plurality of data chunks. For example, the RAID engine 1333 of the controller 1330 may divide the data D0 into data chunks D01, D02, and D03. The inventive concept is not limited to the illustration in FIG. 2, and RAID parameters, such as a data size corresponding to one stripe, a data size corresponding to one data chunk, the number of data chunks included in one stripe, and/or the like, may be changed or modified depending on various factors, such as performance, reliability, storage capacity, and/or the like.

Parity may be generated based on the divided data chunks. The RAID engine 1333 of the controller 1330 may generate parity P03 associated with the data chunks D01, D02, and D03. When some of the data chunks D01, D02, and D03 are lost or damaged, the parity P03 may be used to restore or recover the lost or damaged data chunk(s).

Various operations may be performed to divide the data D0 into the data chunks D01, D02, and D03, and to generate the parity P03. The cache memory 1331 and/or the buffer memory 1350 may store or buffer intermediate results that are generated and processed while such operations are performed.

The divided data chunks and the parity may be distributively stored in a plurality of separate storage areas. For example, the nonvolatile memories 1311, 1312, 1313, and 1314 may distributively store the data chunks D01, D02, and D03 and the parity P03, respectively, under the control of the controller 1330. However, the inventive concept is not limited to this example. As another example, the data chunks D01, D02, and D03 and the parity P03 may be distributed to and stored in nonvolatile memories which are connected to different channels, or may be distributed to different memory areas in one nonvolatile memory.

Since a case where the nonvolatile memories 1311, 1312, 1313, and 1314 simultaneously cause problems rarely occurs, it is unlikely that the data chunks D01, D02, and D03 and the parity P03 are lost or damaged together. In addition, even if a specific nonvolatile memory causes a problem and some data chunks are lost or damaged, the lost or damaged data chunk(s) may be restored or recovered based on the parity P03. Thus, the RAID configuration may increase reliability of the storage device 1300.

Figure 3:
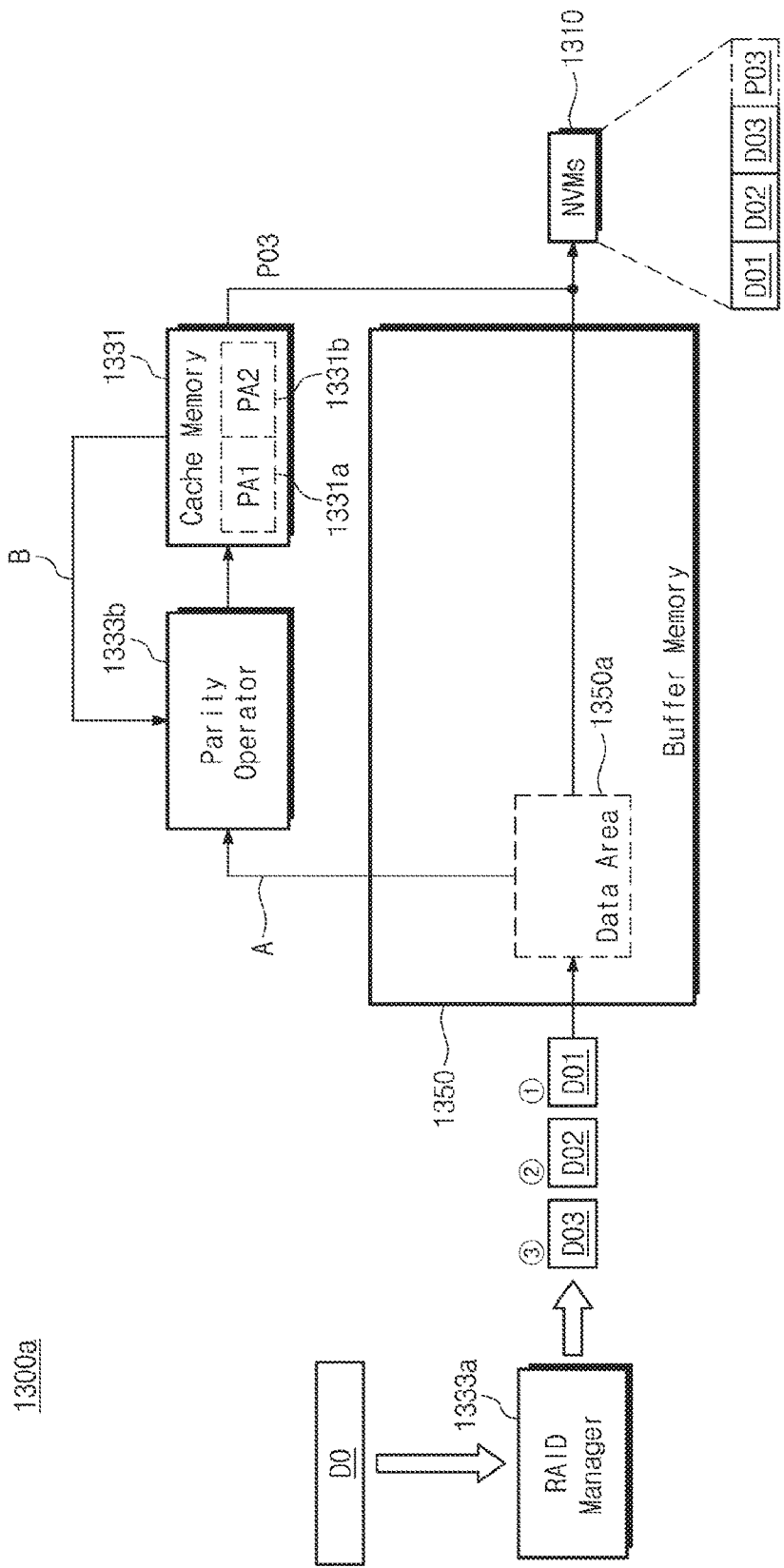
FIG. 3 is a block diagram illustrating a configuration of the storage device of FIG. 1 using RAID according to an exemplary embodiment of the inventive concept.
Figure 4:
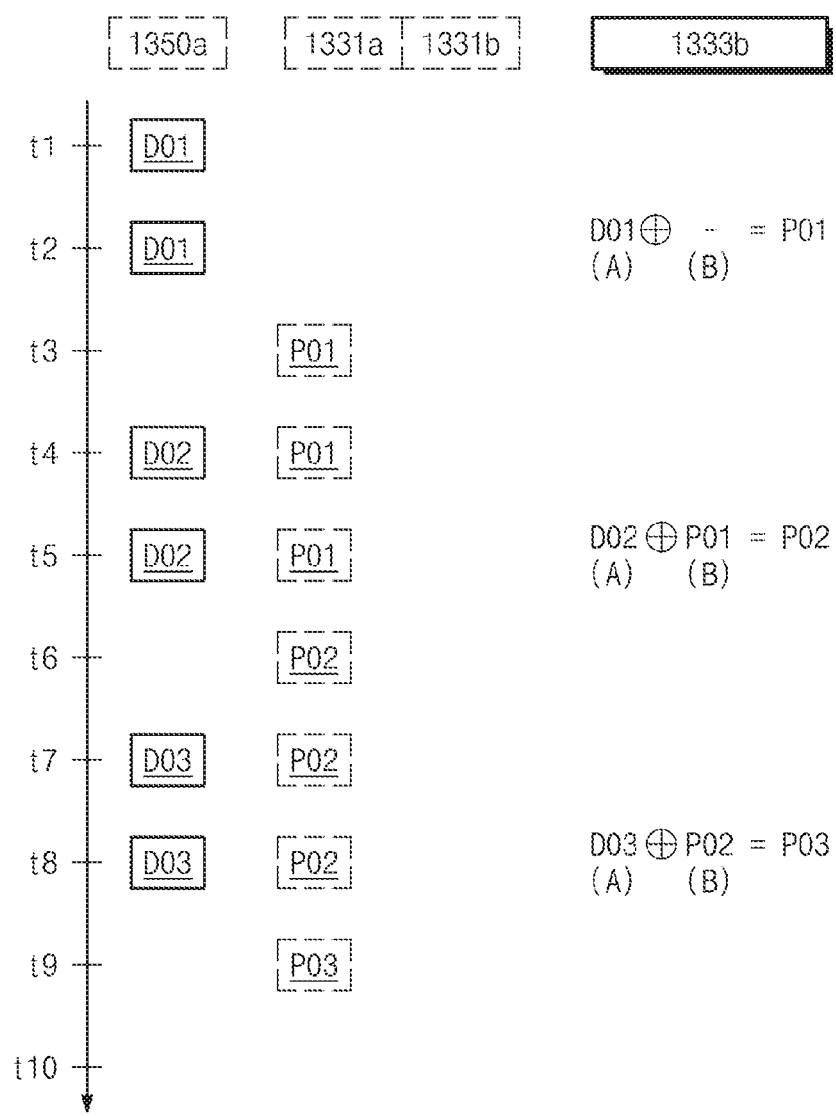
FIG. 4 is a diagram for describing a process of storing data in the storage device of FIG. 3 according to an exemplary embodiment of the inventive concept.

FIG. 3 is a block diagram illustrating a configuration of the storage device of FIG. 1 using RAID according to an exemplary embodiment of the inventive concept. FIG. 4 is a diagram for describing a process of storing data in the storage device of FIG. 3 according to an exemplary embodiment of the inventive concept.

Referring to FIGS. 1 and 3 together, according to exemplary embodiments of the inventive concept, the storage device 1300 of FIG. 1 may include a storage device 1300a of FIG. 3. In the storage device 1300a, the RAID engine 1333 may include a RAID manager 1333a and a parity operator 1333b.

The RAID manager 1333a may receive the data D0. The RAID manager 1333a may divide the data D0 into the data chunks D01, D02, and D03, based on a policy of the storage device 1300A and/or RAID parameter(s) set by a user.

The data chunks D01, D02, and D03 may be sequentially processed. Hereinafter, "sequentially" may refer to the following order: the data chunk D01, the data chunk D02, and the data chunk D03. For example, the data chunks D01, D02, and D03 may be sequentially buffered in the buffer memory 1350. For example, the data chunks D01, D02, and D03 may be sequentially referenced to generate the parity P03.

The buffer memory 1350 may include a data area 1350a. For example, the data chunks D01, D02, and D03 may be buffered in the data area 1350a. Location and size of the data area 1350a may vary depending on an operation of the buffer memory 1350 and an amount of buffered data chunks. The data chunks D01, D02, and D03 may be buffered in the buffer memory 1350, and then may be stored in the nonvolatile memories 1310.

The parity operator 1333b may perform a parity operation to generate the parity P03 based on the data chunks D01, D02, and D03. For example, the parity operation may include a bitwise logical exclusive OR (XOR) operation, but the inventive concept is not limited thereto. For example, the parity operation may be variously changed or modified to generate the parity which is used to restore lost or damaged data chunks.

The cache memory 1331 may store operation results of the parity operator 1333b. For example, the cache memory 1331 may include parity areas 1331a and 1331b allocated to store a final parity and an intermediate parity calculated by the parity operator 1333b. Herein, the final parity may be a parity (e.g., the parity P03) which is distributively stored in the nonvolatile memories 1310 together with the data chunks (e.g., D01 to D03), and the intermediate parity may be an intermediate result obtained while the final parity is calculated.

FIG. 3 illustrates two parity areas 1331a and 1331b, but the number of parity areas may be changed or modified. However, since the cache memory 1331 may be relatively expensive and may have a relatively small capacity, the cache memory 1331 may include only a limited number of parity areas. Thus, a size of parity areas of the cache memory 1331 may not vary and may be fixed. In the present exemplary embodiment, for convenience of description, two parity areas 1331a and 1331b will be described, and it will be assumed that each parity area of the cache memory 1331 may store one parity.

The parity operator 1333b may receive a data chunk, which is buffered in the data area 1350a, along a route A. The parity operator 1333b may receive the intermediate parity, which is stored in the cache memory 1331, along a route B. The parity operator 1333b may perform a parity operation on the received data chunk and the received intermediate parity, and thus, may generate the final parity or a next intermediate parity.

Referring to FIG. 4 together with FIG. 3, at time t1, the data chunk D01 may be buffered in the data area 1350a. Since the data chunk D01 is processed first in connection with the data D0, the parity areas 1331a and 1331b may be empty. At time t2, the parity operator 1333b may receive the data chunk D01 along the route A, and may generate intermediate parity P01 based on the data chunk D01. The intermediate parity P01 may be substantially the same as the data chunk D01. At time t3, the intermediate parity P01 may be stored in the parity area 1331a, and the data chunk D01 may be output to the nonvolatile memories 1310.

At time t4, the data chunk D02 may be buffered in the data area 1350a. At time t5, the parity operator 1333b may receive the data chunk D02 along the route A, and may receive the intermediate parity P01 along the route B. The parity operator 1333b may perform the parity operation (e.g., an exclusive OR (XOR) operation) on the data chunk D02 and the intermediate parity P01 to generate a next intermediate parity P02. At time t6, the intermediate parity P02 may be stored (or updated) in the parity area 1331a, and the data chunk D02 may be output to the nonvolatile memories 1310.

At time t7, the data chunk D03 may be buffered in the data area 1350a. At time t8, the parity operator 1333b may receive the data chunk D03 along the route A, and may receive the intermediate parity P02 along the route B. The parity operator 1333b may perform the parity operation on the data chunk D03 and the intermediate parity P02 to generate the parity P03. At time t9, the parity P03 may be stored (or updated) in the parity area 1331a, and the data chunk D03 may be output to the nonvolatile memories 1310.

For example, the data chunk D03 may include meta- or header information indicating that the data chunk D03 is processed last in connection with the data D0. The RAID engine 1333 may determine, based on the meta- or header information, that the parity P03 is the final parity. At time t10, the cache memory 1331 may output the final parity P03 to the nonvolatile memories 1310, in response to a request of the RAID engine 1333. Thus, the nonvolatile memories 1310 may distributively store the data chunks D01, D02, and D03 and the final parity P03.

Figure 5:
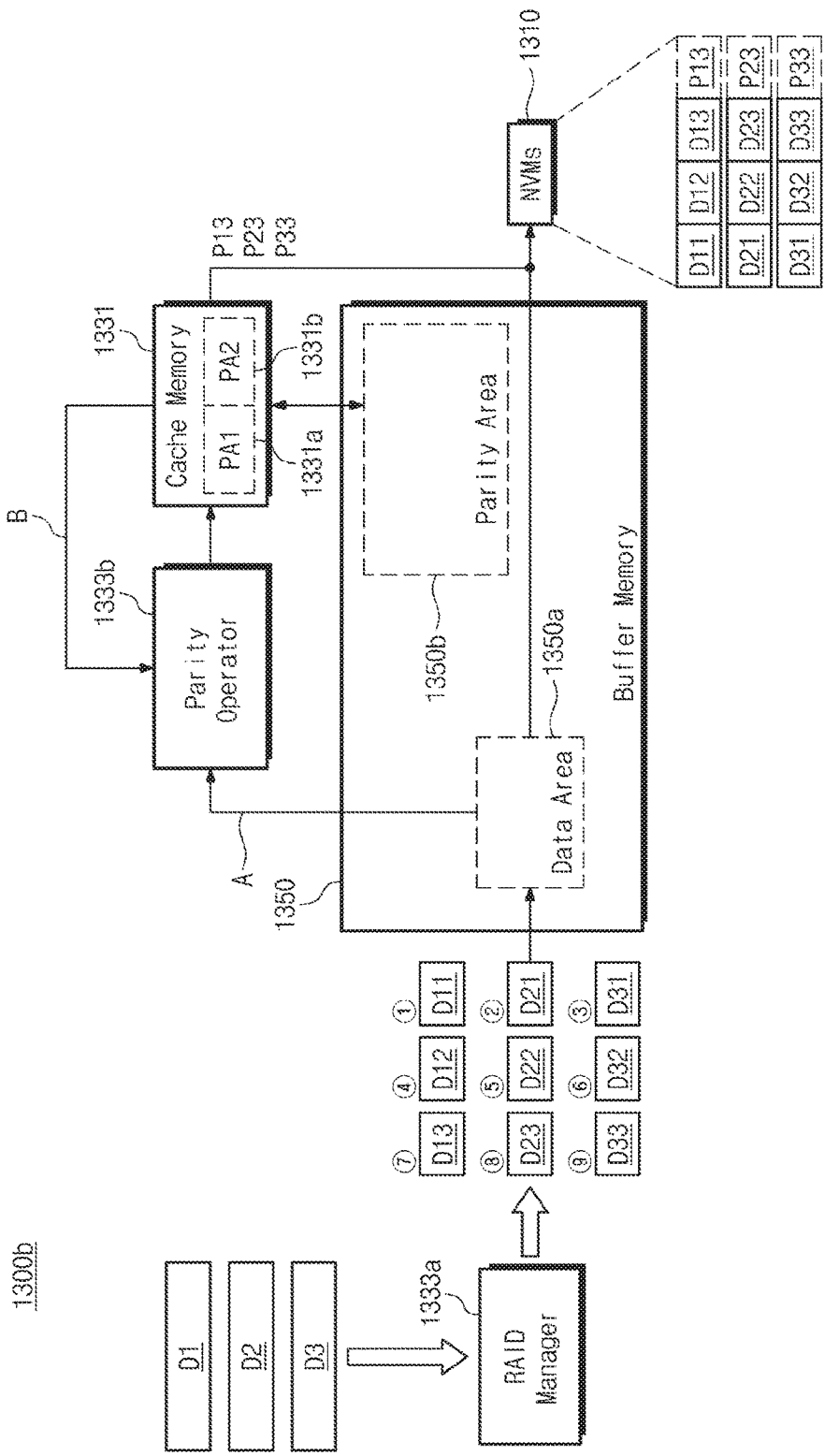
FIG. 5 is a block diagram illustrating a configuration of the storage device of FIG. 1 using RAID according to an exemplary embodiment of the inventive concept.

FIG. 5 is a block diagram illustrating a configuration of the storage device of FIG. 1 using RAID according to an exemplary embodiment of the inventive concept. FIGS. 6A to 6D are diagrams for describing a process of storing data in the storage device of FIG. 5 according to an exemplary embodiment of the inventive concept.

Referring to FIG. 5, according to exemplary embodiments of the inventive concept, the storage device 1300 of FIG. 1 may include a storage device 1300b illustrated in FIG. 5. The storage device 1300b may be configured similarly to the storage device 1300a of FIG. 3. However, in the example of FIGS. 5 to 6D, the RAID manager 1333a may receive a plurality of data D1, D2, and D3, instead of receiving only one data D0.

For example, when the host 1100 requests to store large amounts of data or when a plurality of stripes is generated concurrently inside the storage device 1300b, a plurality of data D1, D2, and D3 may be handled. As another example, when a storage service based on namespace or logical unit number (LUN) is implemented, a plurality of data D1, D2, and D3 may be handled.

The RAID manager 1333a may divide the data D1 into data chunks D11, D12, and D13, may divide the data D2 into data chunks D21, D22, and D23, and may divide the data D3 into data chunks D31, D32, and D33, on the basis of the RAID parameter(s). In the example of FIGS. 5 to 6D, the data chunks D11, D12, D13, D21, D22, D23, D31, D32, and D33 may be sequentially processed in the order of the data chunk D11, the data chunk D21, the data chunk D31, the data chunk D12, the data chunk D22, the data chunk D32, the data chunk D13, the data chunk D23, and the data chunk D33.

For example, each of the data chunks D11, D12, D13, D21, D22, D23, D31, D32, and D33 may include meta- or header information indicating from which of the data D1, D2, or D3 it was divided. For example, each of parities generated from the data chunks D11, D12, D13, D21, D22, D23, D31, D32, and D33 may include meta- or header information indicating with which of the data D1, D2, or D3 it is associated.

Figure 6A:
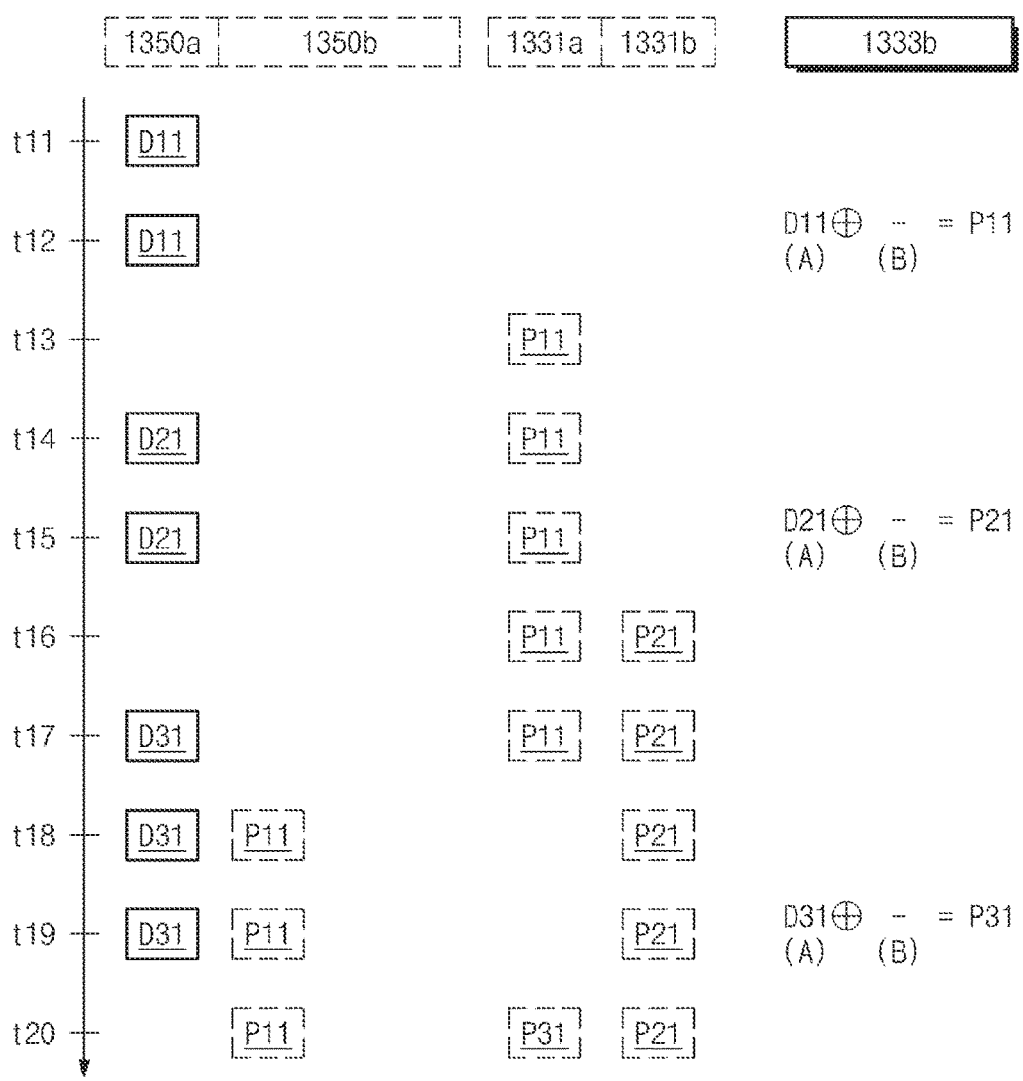

Referring to FIG. 6A together with FIG. 5, at time t11, the data chunk D11 may be buffered in the data area 1350a of the buffer memory 1350. At time t12, the parity operator 1333b may receive the data chunk D11 along the route A, and may generate intermediate parity P11 based on the data chunk D11. At time t13, the intermediate parity P11 may be stored in the parity area 1331a, and the data chunk D11 may be output to the nonvolatile memories 1310.

At time t14, the data chunk D21 may be buffered in the data area 1350a. At time t15, the parity operator 1333b may receive the data chunk D21 along the route A. Meanwhile, the RAID engine 1333 may determine, based on the meta- or header information included in the data chunk D21, that intermediate parity associated with the data chunk D21 is not generated yet. Thus, the parity operator 1333b may generate intermediate parity P21 based on the data chunk D21.

Since the intermediate parity P11 is associated with the data D1 and the intermediate parity P21 is associated with the data D2, at time t16, the intermediate parity P21 may be stored in the parity area 1331b separately from the intermediate parity P11. The data chunk D21 may be output to the nonvolatile memories 1310.

For example, the RAID engine 1333 may manage meta-information in connection with whether each of the parity areas 1331a and 1331b is filled from storing intermediate or final parity. The RAID engine 1333 may determine, based on the meta-information, whether a remaining capacity of a memory area allocated for the final parity and the intermediate parity in the cache memory 1331 is less than a reference capacity (e.g., whether all the parity areas 1331a and 1331b are filled).

At time t17, the data chunk D31 may be buffered in the data area 1350a. However, the RAID engine 1333 may determine that all the parity areas 1331a and 1331b are filled. To perform the parity operation associated with the data chunk D31, at time t18, the intermediate parity P11 in the parity area 1331a of the cache memory 1331 may be stored in the buffer memory 1350, in response to a request from the RAID engine 1333. Thus, the parity area 1331a may become empty. FIG. 6A illustrates that the parity area 1331a becomes empty after the data chunk D31 is received. However, according to exemplary embodiments of the inventive concept, the parity area 1331a may become empty before the data chunk D31 is received.

The buffer memory 1350 may further include a parity area 1350b for buffering intermediate parity. The parity area 1350b may store the intermediate parity P11 at time t18, as described above. The buffer memory 1350 may have a relatively large capacity. Thus, unlike the parity areas 1331a and 1331b, a location and size of the parity area 1350b may be changed depending on an operation of the buffer memory 1350 and an amount of buffered intermediate parities. For example, the RAID engine 1333 may manage meta-information in connection with whether intermediate parity associated with specific data is stored in the cache memory 1331 or is buffered in the buffer memory 1350.

At time t19, the parity operation associated with the data chunk D31 may be performed. The parity operator 1333b may receive the data chunk D31 along the route A, and may generate the intermediate parity P31, associated with the third data D3, based on the data chunk D31. At time t20, the intermediate parity P31 may be stored in the empty parity area 1331a, and the data chunk D31 may be output to the nonvolatile memories 1310.

Figure 6B:
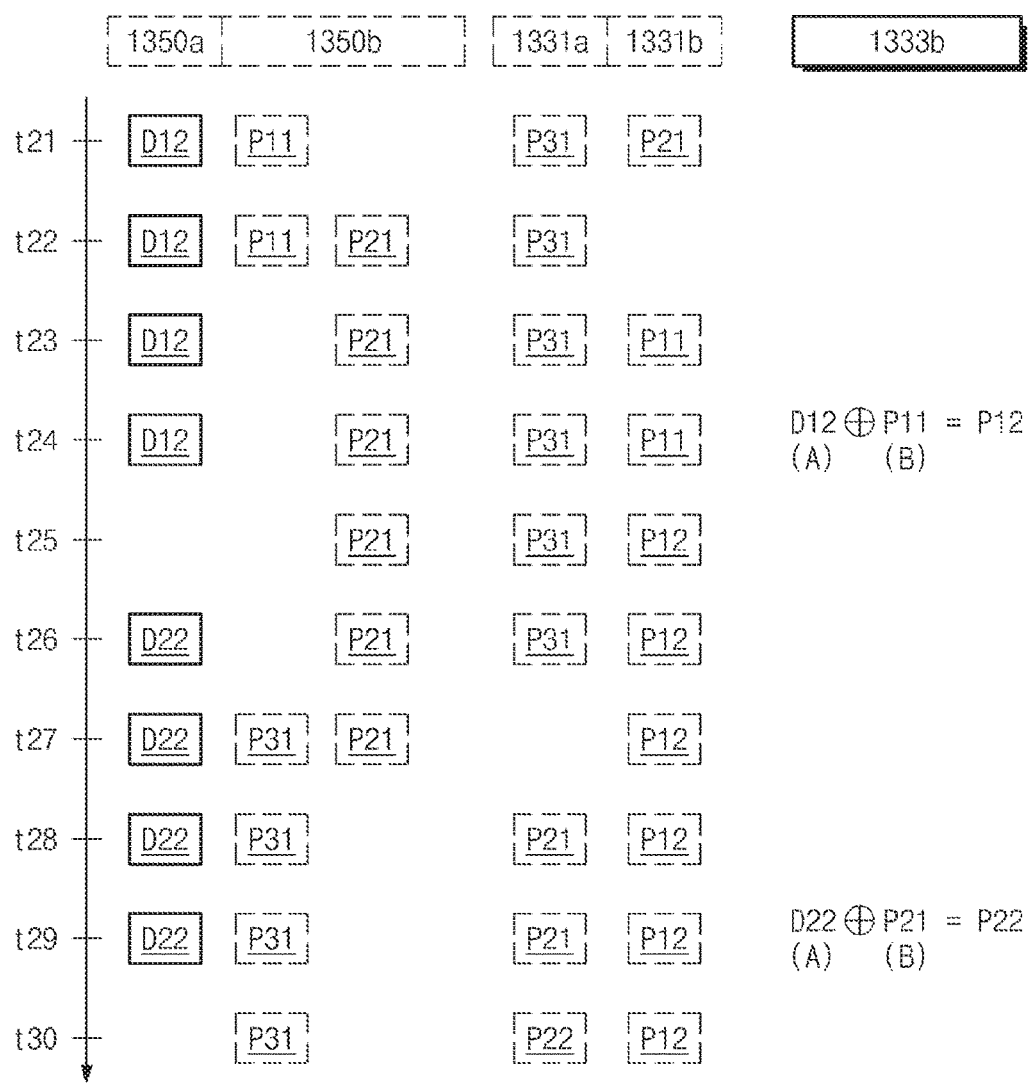
Figure 6D:
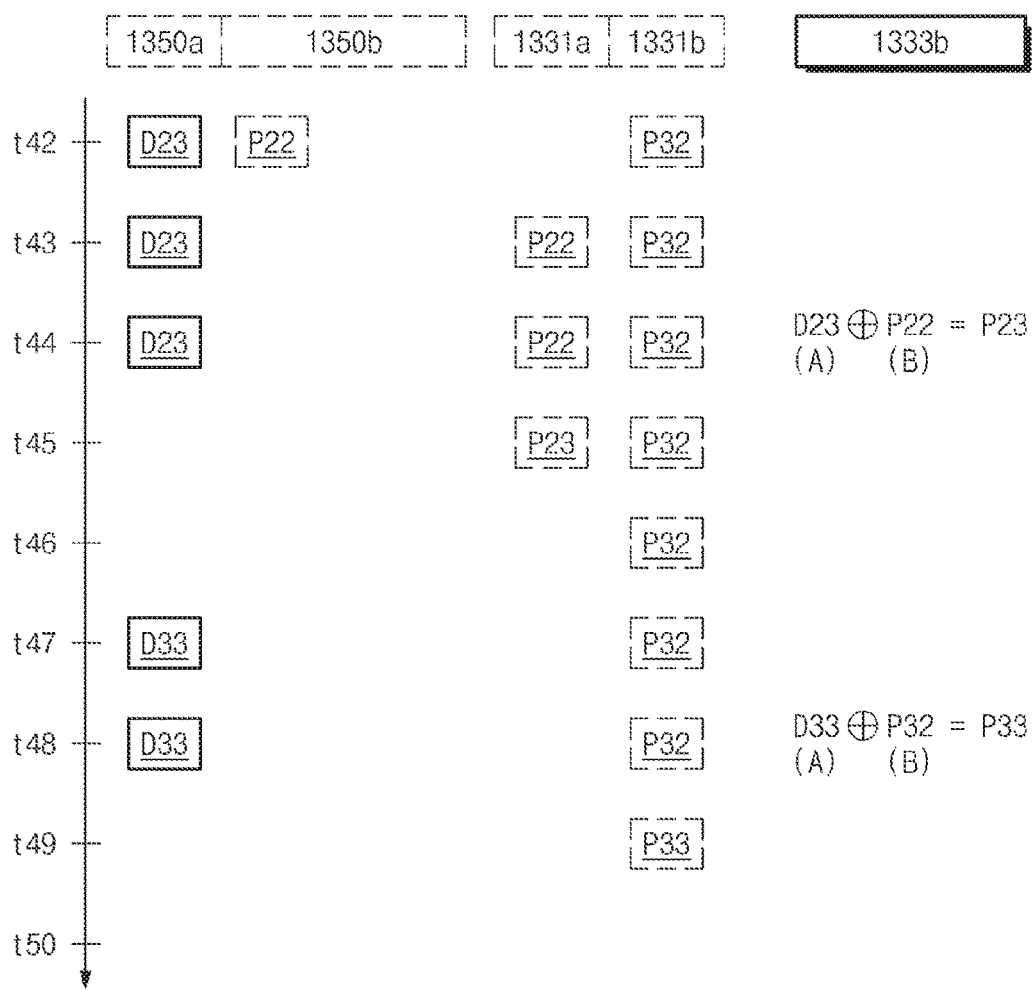

Referring to FIG. 6B together with FIG. 5, at time t21, the data chunk D12 may be buffered in the data area 1350a. Since all the parity areas 1331a and 1331b are filled, at time t22, the intermediate parity P21 from the parity area 1331b may be stored in the parity area 1350b, in response to a request from the RAID engine 1333.

Meanwhile, the RAID engine 1333 may determine, based on the meta-information, that the data chunk D12 associated with the data D1 is provided and the intermediate parity P11 associated with the data D1 is buffered in the buffer memory 1350. Thus, at time t23, the intermediate parity P11 may be loaded into the empty parity area 1331b from the parity area 1350b, in response to a request from the RAID engine 1333.

At time t24, the parity operator 1333b may receive the data chunk D12 along the route A, and may receive the intermediate parity P11 along the route B. The parity operator 1333b may perform the parity operation on the data chunk D12 and the intermediate parity P11 to generate next intermediate parity P12 associated with the data D1. At time t25, the intermediate parity P12 may be stored (or updated) in the parity area 1331b, and the data chunk D12 may be output to the nonvolatile memories 1310.

Similarly, from time t26 to time t30, the parity operator 1333b may perform the parity operation on the data chunk D22 and the intermediate parity P21. To this end, in response to a determination and a request of the RAID engine 1333, the intermediate parity P31 from the parity area 1331a may be stored in the parity area 1350b, and the intermediate parity P21 may be loaded into the empty parity area 1331a from the parity area 1350b. Next intermediate parity P22, associated with the data D2, may be generated by the parity operation, and may be stored (or updated) in the parity area 1331a.

Referring to FIG. 6C together with FIG. 5, from time t31 to time t35, the parity operator 1333b may perform the parity operation on the data chunk D32 and the intermediate parity P31. To this end, in response to a determination and a request of the RAID engine 1333, the intermediate parity P12 from the parity area 1331b may be stored in the parity area 1350b, and the intermediate parity P31 may be loaded into the empty parity area 1331b from the parity area 1350b. Next intermediate parity P32, associated with the data D3, may be generated by the parity operation, and may be stored (or updated) in the parity area 1331b.

From time t36 to t40, the parity operator 1333b may perform the parity operation on the data chunk D13 and the intermediate parity P12. To this end, in response to a determination and a request of the RAID engine 1333, the intermediate parity P22 from the parity area 1331a may be stored in the parity area 1350b, and the intermediate parity P12 may be loaded into the empty parity area 1331a from the parity area 1350b. Next intermediate parity P13, associated with the data D1, may be generated by the parity operation, and may be stored (or updated) in the parity area 1331a.

Meanwhile, since the data chunk D13 is a data chunk which is processed last in connection with the data D1, at time t41, the parity P13 may be output to the nonvolatile memories 1310 as a final parity, in response to a request from the RAID engine 1333. Thus, the nonvolatile memories 1310 may distributively store the data chunks D11, D12, and D13 and the final parity P13 in connection with the data D1.

Referring to FIG. 6D together with FIG. 5, similarly, from time t42 to time t45, the parity operator 1333b may perform the parity operation on the data chunk D23 and the intermediate parity P22. To this end, in response to a determination and a request of the RAID engine 1333, the intermediate parity P22 may be loaded into the empty parity area 1331a from the parity area 1350b. Next intermediate parity P23 associated with the data D2 may be generated by the parity operation, and may be stored (or updated) in the parity area 1331a.

Meanwhile, since the data chunk D23 is a data chunk which is processed last in connection with the data D2, at time t46, the parity P23 may be output to the nonvolatile memories 1310 as a final parity, in response to a request from the RAID engine 1333. Thus, the nonvolatile memories 1310 may distributively store the data chunks D21, D22, and D23 and the final parity P23 in connection with the data D2.

From time t47 to time t49, the parity operator 1333b may perform the parity operation on the data chunk D33 and the intermediate parity P32 to generate parity P33 associated with the data D3. The parity P33 may be stored (or updated) in the parity area 1331b.

Meanwhile, since the data chunk D33 is a data chunk which is processed last in connection with the data D3, at time t50, the parity P33 may be output to the nonvolatile memories 1310 as a final parity, in response to a request from the RAID engine 1333. Thus, the nonvolatile memories 1310 may distributively store the data chunks D31, D32, and D33 and the final parity P33 in connection with the data D3.

Figure 7:
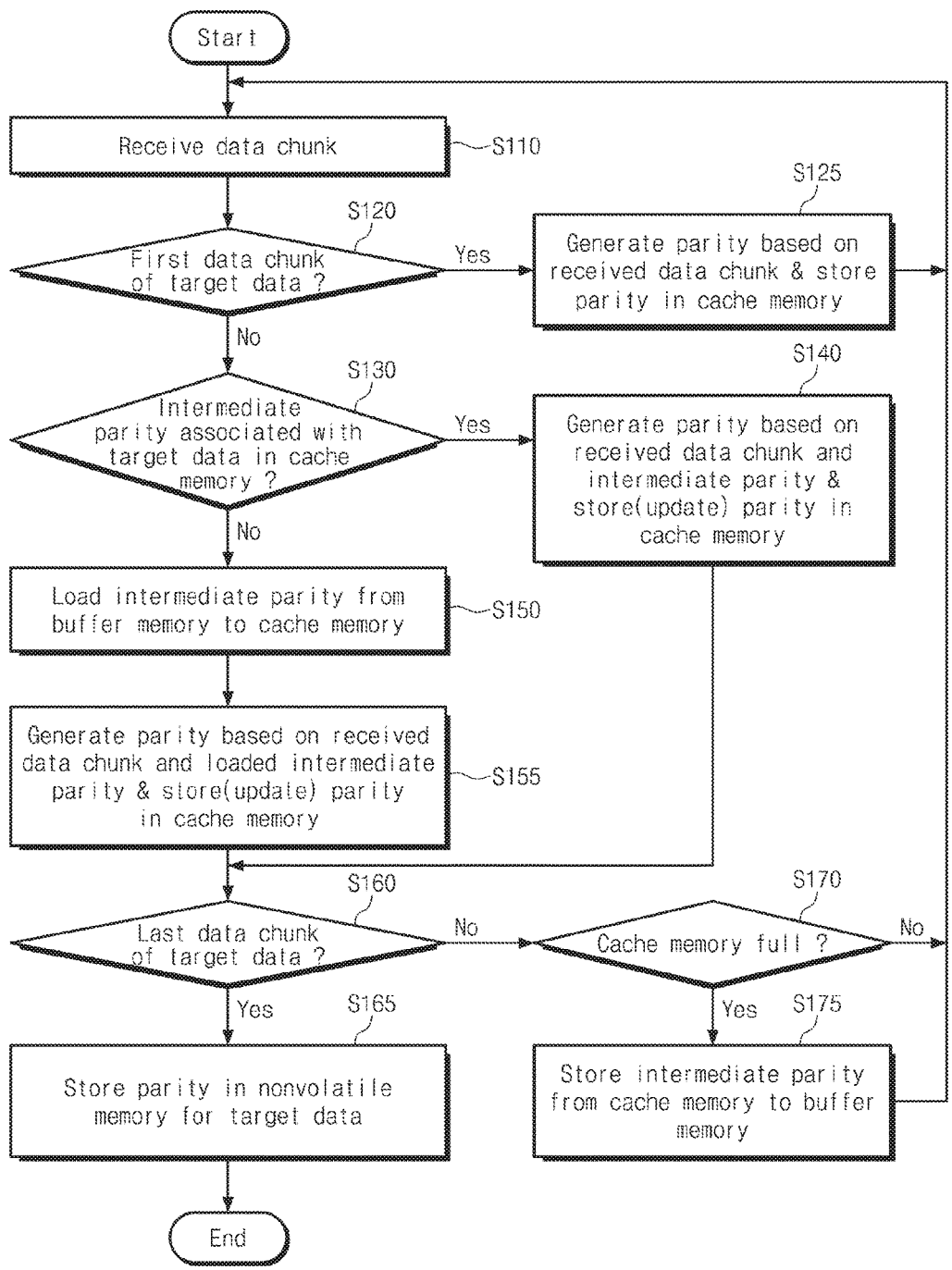
FIG. 7 is a flowchart describing a process of storing data in the storage device of FIG. 5 according to an exemplary embodiment of the inventive concept.

FIG. 7 is a flowchart describing a process of storing data in the storage device of FIG. 5 according to an exemplary embodiment of the inventive concept.

Referring to FIGS. 5 and 7 together, in operation S110, a data chunk divided from target data may be received and buffered in the data area 1350a of the buffer memory 1350. In operation S120, the RAID engine 1333 may determine, based on meta- or header information of the received data chunk, whether the received data chunk is a data chunk which is processed first in connection with the target data.

When the received data chunk is processed first in connection with the target data, intermediate parity may not be generated yet. Thus, in operation S125, the parity operator 1333b may generate intermediate parity based on the received data chunk, and the generated intermediate parity may be stored in an empty parity area of the cache memory 1331. Afterwards, in operation S110, a next data chunk may be received.

On the other hand, when the received data chunk is not a data chunk which is processed first in connection with the target data, operation S130 may be performed. In operation S130, the RAID engine 1333 may determine, based on meta-information which is managed by the RAID engine 1333, whether intermediate parity is stored in the cache memory 1331.

When the intermediate parity exists in the cache memory 1331, operation S140 may be performed. In operation S140, the parity operator 1333b may generate next parity, based on the data chunk received along the route A and the intermediate parity received from the cache memory 1331 along the route B (e.g., operations at time t5 of FIG. 4). This parity may be stored (or updated) in a parity area of the cache memory 1331.

On the other hand, when the intermediate parity does not exist in the cache memory 1331 (e.g., when the intermediate parity is buffered in the buffer memory 1350), operation S150 may be performed. In operation S150, in response to a request from the RAID engine 1333, the intermediate parity may be loaded from the buffer memory 1350 into the cache memory 1331 (e.g., operations at time t22 and time t23 of FIG. 6B). Afterwards, in operation S155, the parity operator 1333b may generate next parity, based on the data chunk received along the route A and the loaded intermediate parity received from the cache memory 1331 along the route B (e.g., operations at time t24 of FIG. 6B). This parity may be stored (or updated) in a parity area of the cache memory 1331.

When parity is generated in operation S140 or S155, in operation S160, the RAID engine 1333 may determine, based on the meta- or header information of the received data chunk, whether the received data chunk is a data chunk which is processed last in connection with the target data. When the received data chunk is a last processed data chunk, in operation S165, the generated parity may be stored in the nonvolatile memories 1310 as the final parity associated with the target data.

On the other hand, when the received data chunk is not the last processed data chunk, operation S170 may be performed. In operation S170, the RAID engine 1333 may determine, based on the meta-information which is managed by the RAID engine 1333, whether a remaining capacity of a memory area allocated for final parity and intermediate parity in the cache memory 1331 is less than a reference capacity (e.g., all the parity areas of the cache memory 1331 are full).

When the remaining capacity is greater than or equal to the reference capacity (e.g., some of the parity areas of the cache memory 1331 are still empty), in operation S110, a next data chunk may be received.

When the remaining capacity is less than the reference capacity, operation S175 may be performed. In operation S175, in response to a request from the RAID engine 1333, intermediate parity of the cache memory 1331 may move to and be buffered in the buffer memory 1350 (e.g., operations at time t21 and time t22 of FIG. 6B). Thus, an empty parity area of the cache memory 1331 may be secured. Afterwards, in operation S110, a next data chunk may be received.

According to the present exemplary embodiment described with reference to FIGS. 5 to 7, although the plurality of data D1, D2, and D3 is provided using a limited number of parity areas (e.g., 1331a and 1331b), the parity operator 1333b may perform parity operations without any intermediate parity being lost. However, a process (e.g., operation S175) of storing intermediate parity in the buffer memory 1350 from the cache memory 1331 and a process (e.g., operation S150) of loading intermediate parity from the buffer memory 1350 into the cache memory 1331 may unnecessarily increase latency. As an amount of data and data chunks increases, loading and storing of the data may be frequently repeated and performance of the storage device 1300 may be degraded.

Thus, when some of processes of loading and storing data between different memories (e.g., the cache memory 1331 and the buffer memory 1350) are omitted during generation of final parity, latency for generating the final parity may decrease. This may increase performance of the storage device 1300.

Figure 8:
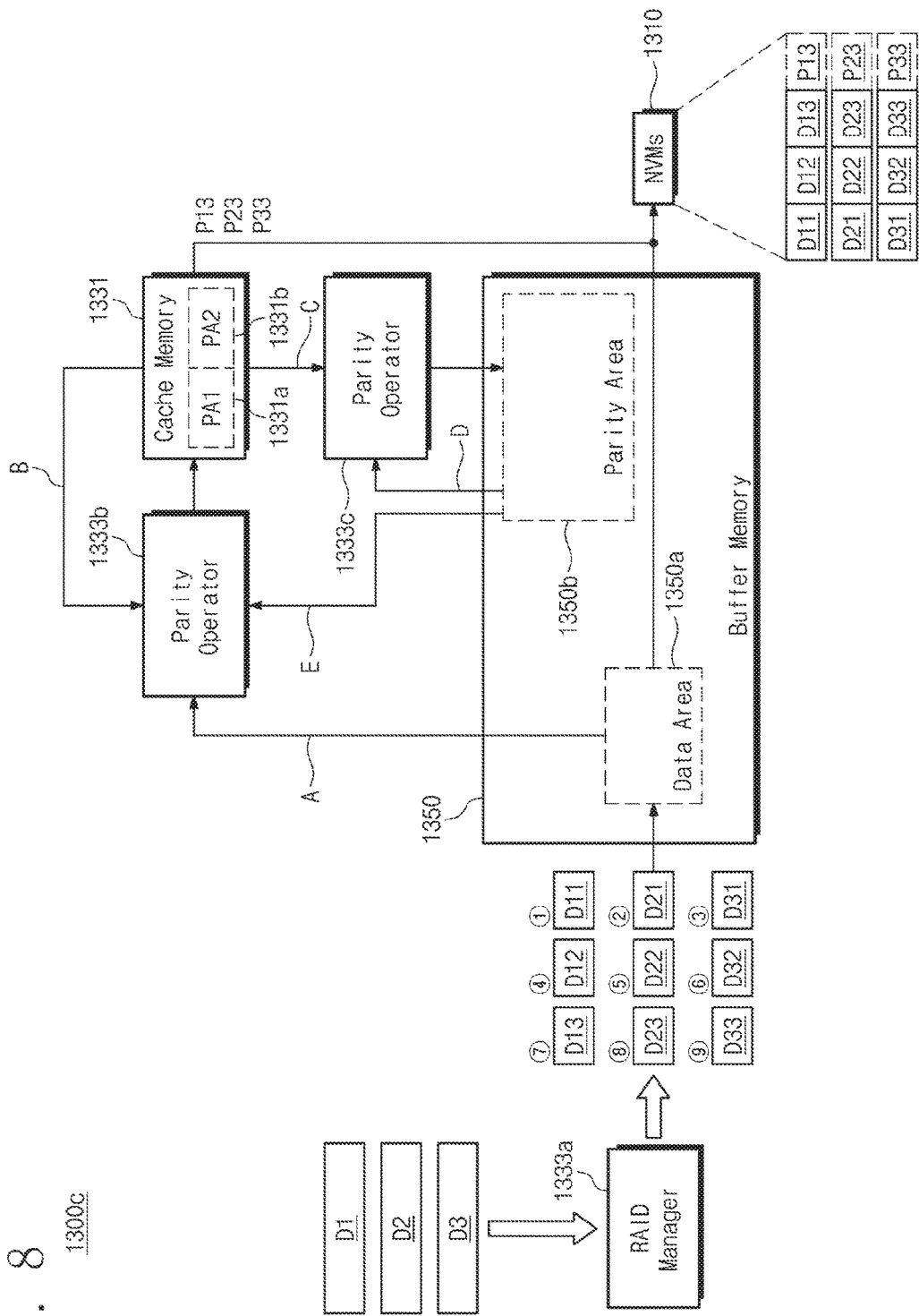
FIG. 8 is a block diagram illustrating a configuration of the storage device of FIG. 1 using RAID according to an exemplary embodiment of the inventive concept.
Figure 9A:
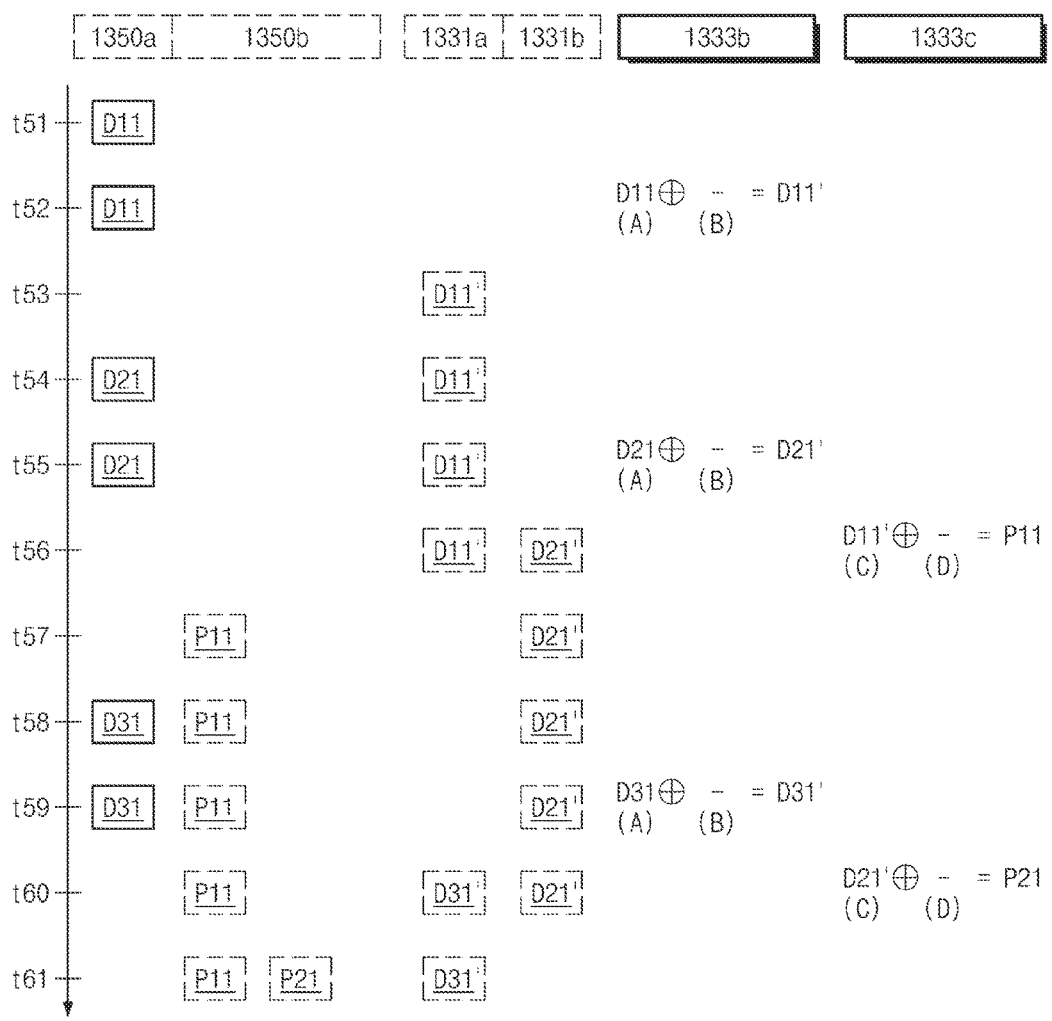
FIGS. 9A to 9C are diagrams for describing a process of storing data in the storage device of FIG. 8 according to an exemplary embodiment of the inventive concept.
Figure 9B:
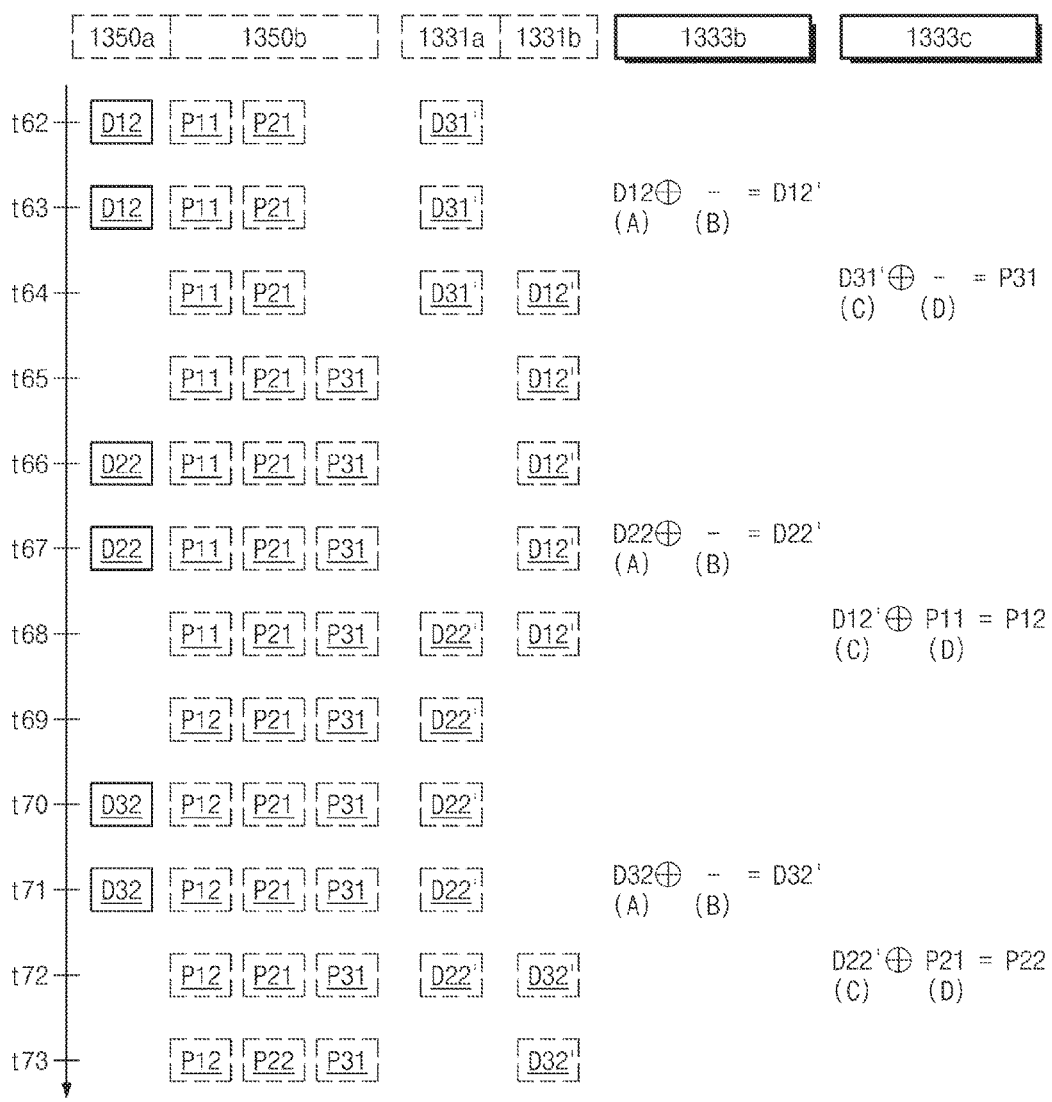
Figure 9C:
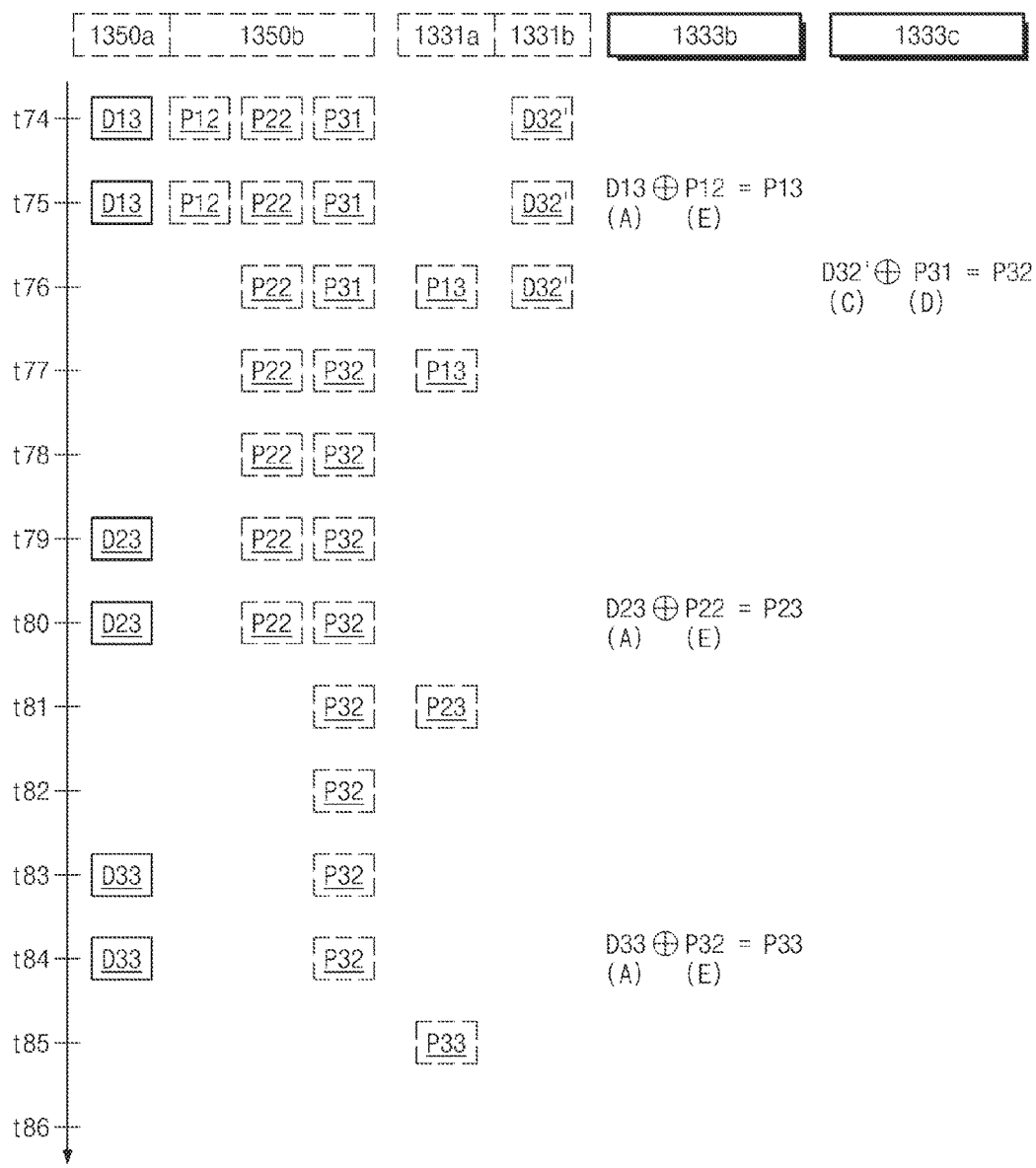

FIG. 8 is a block diagram illustrating a configuration of the storage device of FIG. 1 using RAID according to an exemplary embodiment of the inventive concept. FIGS. 9A to 9C are diagrams for describing a process of storing data in the storage device of FIG. 8 according to an exemplary embodiment of the inventive concept.

Referring to FIG. 8, according to an exemplary embodiment of the inventive concept, the storage device 1300 of FIG. 1 may include a storage device 1300c illustrated in FIG. 8. The storage device 1300c may include components which are similar to those of the storage device 1300b of FIG. 5. However, in the example of FIGS. 8 to 9C, the storage device 1300c may further include an additional parity operator 1333c.

The parity operator 1333c may perform the parity operation similar to the parity operator 1333b. However, the parity operator 1333c may be configured with connections different from those of the parity operator 1333b. The parity operator 1333c will be described in more detail below with reference to FIGS. 9A to 9C together.

In the example of FIGS. 8 to 9C, the RAID manager 1333a may receive the plurality of data D1, D2, and D3. The RAID manager 1333a may divide the data D1 into data chunks D11, D12, and D13, may divide the data D2 into data chunks D21, D22, and D23, and may divide the data D3 into data chunks D31, D32, and D33, on the basis of RAID parameter(s). In the example of FIGS. 8 to 9C, the data chunks D11, D12, D13, D21, D22, D23, D31, D32, and D33 may be sequentially processed in the order of the data chunk D11, the data chunk D21, the data chunk D31, the data chunk D12, the data chunk D22, the data chunk D32, the data chunk D13, the data chunk D23, and the data chunk D33.

Referring to FIG. 9A together with FIG. 8, at time t51, the data chunk D11 may be buffered in the data area 1350a of the buffer memory 1350. At time t52, the parity operator 1333b may receive the data chunk D11 along the route A. Intermediate parity associated with the data chunk D11 is not generated yet, and the parity operator 1333b may generate intermediate parity D11' associated with the data D1 based on the data chunk D11. At time t53, the intermediate parity D11' may be stored in the parity area 1331a, and the data chunk D11 may be output to the nonvolatile memories 1310.

At time t54, the data chunk D21 may be buffered in the data area 1350a. At time t55, the parity operator 1333b may receive the data chunk D21 along the route A, and may generate intermediate parity D21' associated with the data D2 based on the data chunk D21.

At time t56, the intermediate parity D21' may be stored in the empty parity area 1331b, and the data chunk D21 may be output to the nonvolatile memories 1310. Meanwhile, since all of the parity areas 1331a, and 1331b have become full, the intermediate parity D11' may be output from the cache memory 1331 to the parity operator 1333c, in response to a request from the RAID engine 1333. The parity operator 1333c may receive the intermediate parity D11' along a route C, and may generate intermediate parity P11 based on the intermediate parity D11'. Each of the intermediate parities D11' and P11 may be substantially the same as the data chunk D11.

At time t57, the intermediate parity P11 generated by the parity operator 1333c may be buffered in the parity area 1350b of the buffer memory 1350. Thus, the empty parity area 1331a may be secured in the cache memory 1331. FIG. 9A illustrates that the parity area 1331a becomes empty before the data chunk D31 is received. However, according to exemplary embodiments of the inventive concept, the parity area 1331a may become empty after the data chunk D31 is received.

At time t58, the data chunk D31 may be buffered in the data area 1350a. At time t59, the parity operator 1333b may receive the data chunk D31 along the route A, and may generate intermediate parity D31' associated with the data D3 based on the data chunk D31.

At time t60, the intermediate parity D31' may be stored in the empty parity area 1331a, and the data chunk D31 may be output to the nonvolatile memories 1310. Meanwhile, in response to a request from the RAID engine 1333, the parity operator 1333c may receive the intermediate parity D21' of the cache memory 1331 along the route C, and may generate intermediate parity P21 based on the intermediate parity D21'. At time t61, the intermediate parity P21 may be buffered in the parity area 1350b.

Referring to FIG. 9B together with FIG. 8, at time t62, the data chunk D12 may be buffered in the data area 1350a. Meanwhile, the RAID engine 1333 may determine, based on meta-information, that the intermediate parity P11 associated with the data D1 is not in the cache memory 1331 but is buffered in the buffer memory 1350. To prevent latency from increasing, the intermediate parity P11 may not be loaded into the cache memory 1331. Instead, at time t63, the parity operator 1333b may receive the data chunk D12 along the route A, and may generate intermediate parity D12' based on the data chunk D12.

At time t64, the intermediate parity D12' may be stored in the empty parity area 1331b, and the data chunk D12 may be output to the nonvolatile memories 1310. Meanwhile, in response to a request from the RAID engine 1333, the parity operator 1333c may receive the intermediate parity D31' of the cache memory 1331 along the route C, and may generate intermediate parity P31 based on the intermediate parity D31'. At time t65, the intermediate parity P31 may be buffered in the parity area 1350b.

At time t66, the data chunk D22 may be buffered in the data area 1350a. Since the intermediate parity P21 associated with the data D2 is not in the cache memory 1331 but is buffered in the buffer memory 1350, at time t67, the parity operator 1333b may receive the data chunk D22 along the route A, and may generate intermediate parity D22' based on the data chunk D22.

At time t68, the intermediate parity D22' may be stored in the empty parity area 1331a, and the data chunk D22 may be output to the nonvolatile memories 1310. Meanwhile, in response to a request from the RAID engine 1333, the parity operator 1333c may receive the intermediate parity D12' of the cache memory 1331 along the route C. Herein, the intermediate parity P11 associated with the intermediate parity D12' was buffered earlier in the parity area 1350b. Thus, the parity operator 1333c may further receive the intermediate parity P11 from the buffer memory 1350 along a route D. The parity operator 1333c may generate intermediate parity P12 based on the intermediate parity D12' and the intermediate parity P11.

At time t69, the intermediate parity P12 may not be stored in the cache memory 1331, but may be output from the parity operator 1333c to the buffer memory 1350. Thus, the intermediate parity P12 may be buffered in the parity area 1350b. In other words, the intermediate parity P12 may be immediately buffered in the buffer memory 1350 by using the parity operator 1333c, instead of loading the intermediate parity P11 into the cache memory 1331, generating the intermediate parity P12 by the parity operator 1333b, and outputting the intermediate parity P12 to the buffer memory 1350.

According to the present exemplary embodiment, intermediate parity may not be lost while omitting a process of loading the intermediate parity, buffered in the buffer memory 1350, into the cache memory 1331. As some of the processes of loading and storing data between different memories are omitted, latency may decrease and performance of the storage device 1300c may be increased.

Similarly, from time t70 to time t73, the parity operator 1333b may generate intermediate parity D32' based on the data chunk D32 received along the route A. The parity operator 1333c may receive the intermediate parity D22' of the cache memory 1331 along the route C, and may receive the intermediate parity P21 of the buffer memory 1350 along the route D. The parity operator 1333c may generate intermediate parity P22 based on the intermediate parity D22' and the intermediate parity P21. The intermediate parity P22 may be buffered in the buffer memory 1350, and the empty parity area 1331a may be secured.

Referring to FIG. 9C together with FIG. 8, at time t74, the data chunk D13 may be buffered in the data area 1350a. At time t75, the parity operator 1333b may receive the data chunk D13 along the route A. Meanwhile, the RAID engine 1333 may determine, based on meta- or header information, that the data chunk D13 is a data chunk which is processed last in connection with the data D1. In this case, in response to a request from the RAID engine 1333, the parity operator 1333b may receive the intermediate parity P12 of the buffer memory 1350 along a route E. The parity operator 1333b may generate parity P13 based on the data chunk D13 and the intermediate parity P12.

At time t76, the parity P13 may be stored in the empty parity area 1331a. Meanwhile, in response to a request from the RAID engine 1333, the parity operator 1333c may receive intermediate parity D32' of the cache memory 1331 along the route C, and may receive the intermediate parity P31 of the buffer memory 1350 along the route D. The parity operator 1333c may generate intermediate parity P32 based on the intermediate parity D32' and the intermediate parity P31.

At time t77, the intermediate parity P32 may be buffered in the parity area 1350b. At time t78, the parity P13 may be output to the nonvolatile memories 1310 as final parity, in response to a request from the RAID engine 1333. Thus, the nonvolatile memories 1310 may distributively store the data chunks D11, D12, and D13 and the final parity P13 in connection with the data D1.

Similarly, from time t79 to time t82, the parity operator 1333b may receive the data chunk D23 along the route A, and may receive the intermediate parity P22 of the buffer memory 1350 along the route E. The parity operator 1333b may generate parity P23 based on the data chunk D23 and the intermediate parity P22. The parity P23 may be output to the nonvolatile memories 1310 as final parity, in response to a request from the RAID engine 1333. Thus, the nonvolatile memories 1310 may distributively store the data chunks D21, D22, and D23 and the final parity P23 in connection with the data D2.

From time t83 to time t86, the parity operator 1333b may receive the data chunk D33 along the route A, and may receive the intermediate parity P32 of the buffer memory 1350 along the route E. The parity operator 1333b may generate parity P33 based on the data chunk D33 and the intermediate parity P32. The parity P33 may be output to the nonvolatile memories 1310 as final parity, in response to a request from the RAID engine 1333. Thus, the nonvolatile memories 1310 may distributively store the data chunks D31, D32, and D33 and the final parity P33 in connection with the data D3.

Figure 10:
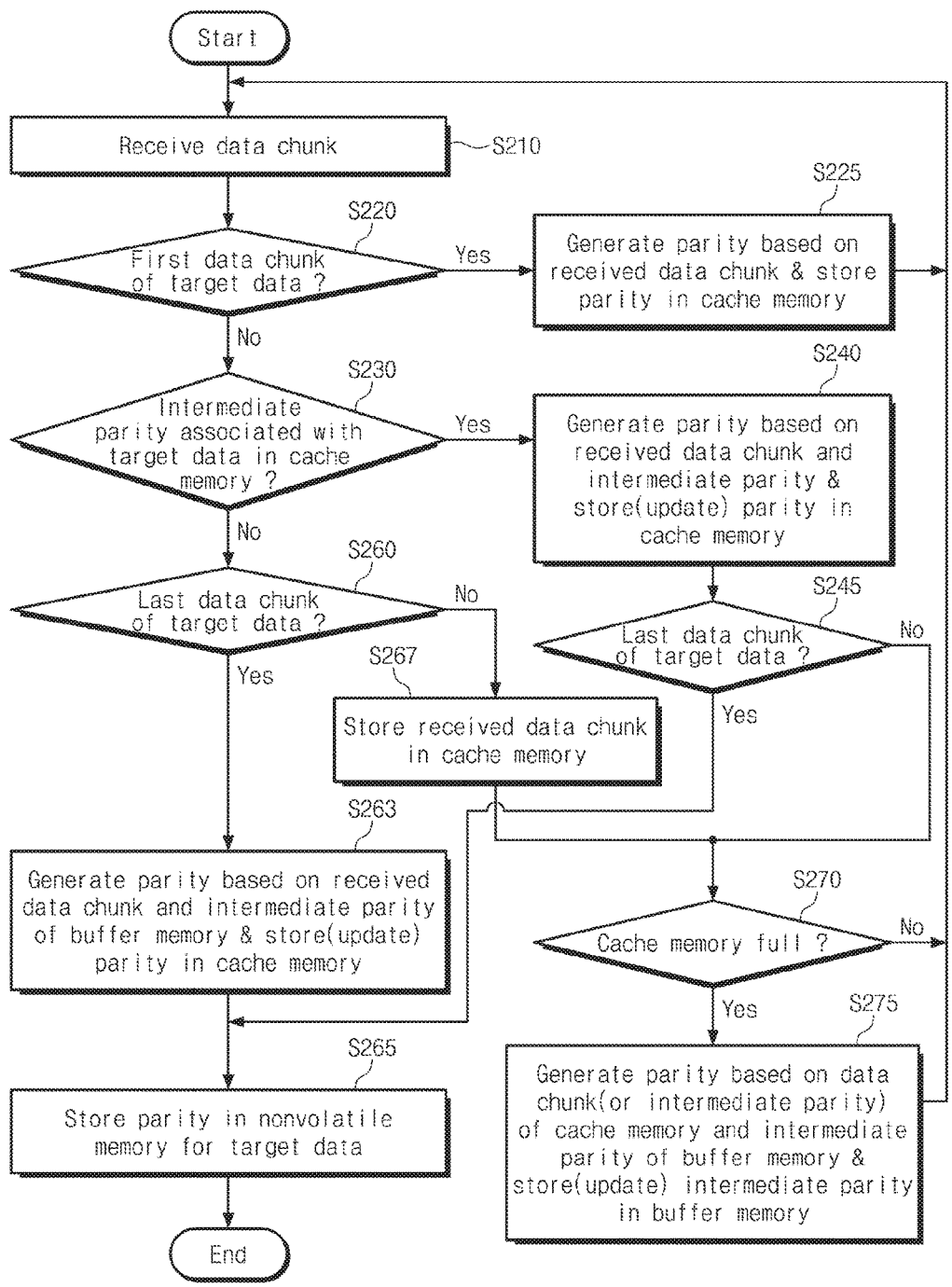
FIG. 10 is a flowchart describing a process of storing data in the storage device of FIG. 8 according to an exemplary embodiment of the inventive concept.

FIG. 10 is a flowchart describing a process of storing data in the storage device of FIG. 8 according to an exemplary embodiment of the inventive concept.

Referring to FIGS. 8 and 10 together, in operation S210, a data chunk divided from target data may be received and buffered in the data area 1350a of the buffer memory 1350. In operation S220, the RAID engine 1333 may determine, based on meta- or header information of the received data chunk, whether the received data chunk is a data chunk which is processed first in connection with the target data.

When the received data chunk is processed first in connection with the target data, intermediate parity may not be generated yet. Thus, in operation S225, the parity operator 1333b may generate intermediate parity based on the received data chunk, and the generated intermediate parity may be stored in an empty parity area of the cache memory 1331. Afterwards, in operation S210, a next data chunk may be received.

On the other hand, when the received data chunk is not a data chunk which is processed first in connection with the target data, operation S230 may be performed. In operation S230, the RAID engine 1333 may determine, based on meta-information managed by the RAID engine 1333, whether intermediate parity is stored in the cache memory 1331.

When the intermediate parity exists in the cache memory 1331, operation S240 may be performed. In operation S240, the parity operator 1333b may generate a next parity, based on the data chunk received along the route A and the intermediate parity received from the cache memory 1331 along the route B (e.g., operations at time t5 of FIG. 4). This parity may be stored (or updated) in a parity area of the cache memory 1331.

Afterwards, in operation S245, the RAID engine 1333 may determine, based on meta- or header information of the received data chunk, whether the received data chunk is a data chunk which is processed last in connection with the target data. When the received data chunk is a last processed data chunk, operation S265 may be performed. On the other hand, when the received data chunk is not the last processed data chunk, operation S270 may be performed.

On the other hand, when it is determined that the intermediate parity does not exist in the cache memory 1331 (e.g., when the intermediate parity is buffered in the buffer memory 1350), operation S260 may be performed. In operation S260, the RAID engine 1333 may determine, based on meta- or header information of the received data chunk, whether the received data chunk is a data chunk which is processed last in connection with the target data.

When the received data chunk is the last processed data chunk, operation S263 may be performed. In operation S263, the parity operator 1333b may generate a next parity, based on the data chunk received along the route A and the intermediate parity of the buffer memory 1350 received along the route E (e.g., operations at time t75 of FIG. 9C). This parity may be temporarily stored in an empty parity area of the cache memory 1331. Afterwards, in operation S265, the generated parity may be stored in the nonvolatile memories 1310 as a final parity associated with the target data.

On the other hand, when the received data chunk is not the last processed data chunk, operation S267 may be performed. In operation S267, the parity operator 1333b may generate a next parity based on the data chunk received along the route A, and this parity may be stored in the cache memory 1331 (e.g., operations at time t63 and time t64 of FIG. 9B). In other words, intermediate parity of the buffer memory 1350 may not be loaded into the cache memory 1331, and latency may be prevented from increasing.

Afterwards, in operation S270, the RAID engine 1333 may determine, based on the meta-information managed by the RAID engine 1333, whether a remaining capacity of a memory area allocated for final parity and intermediate parity in the cache memory 1331 is less than a reference capacity (e.g., all the parity areas of the cache memory 1331 are full). When the remaining capacity is greater than or equal to the reference capacity (e.g., some of parity areas of the cache memory 1331 are still empty), in operation S210, a next data chunk may be received.

On the other hand, when the remaining capacity is less than the reference capacity, operation S275 may be performed. In operation S275, in response to a request from the RAID engine 1333, the parity operator 1333c may receive intermediate parity of the cache memory 1331 along the route C, and may receive intermediate parity of the buffer memory 1350 along the route D. The parity operator 1333c may generate next intermediate parity based on the received intermediate parities (e.g., operations at time t68 of FIG. 9B). The generated intermediate parity may not be stored in the cache memory 1331, but may be immediately buffered (or updated) in the parity area 1350b. Afterwards, in operation S210, a next data chunk may be received.

Figure 11:
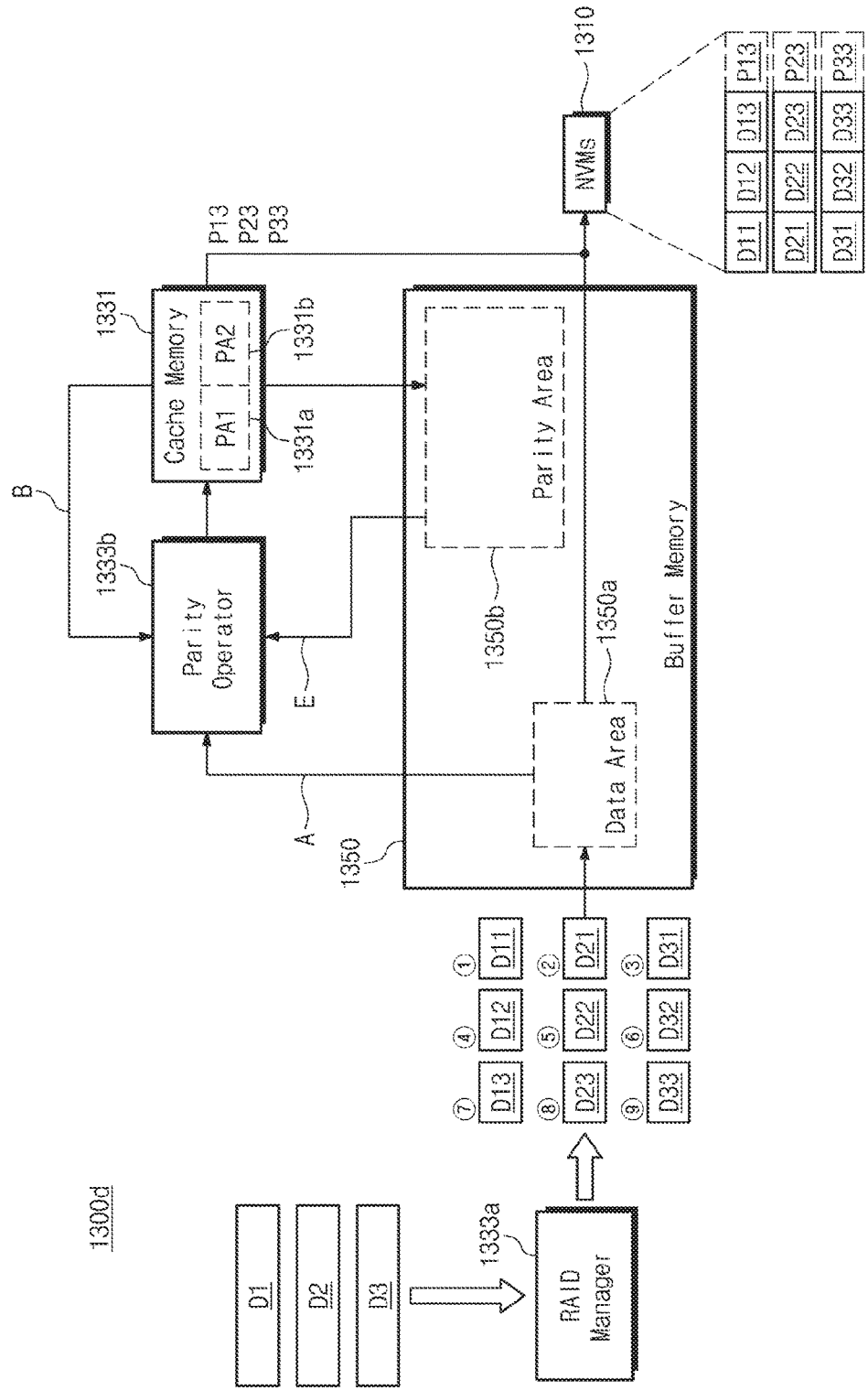
FIG. 11 is a block diagram illustrating a configuration of the storage device of FIG. 1 using RAID according to an exemplary embodiment of the inventive concept.
Figure 12A:
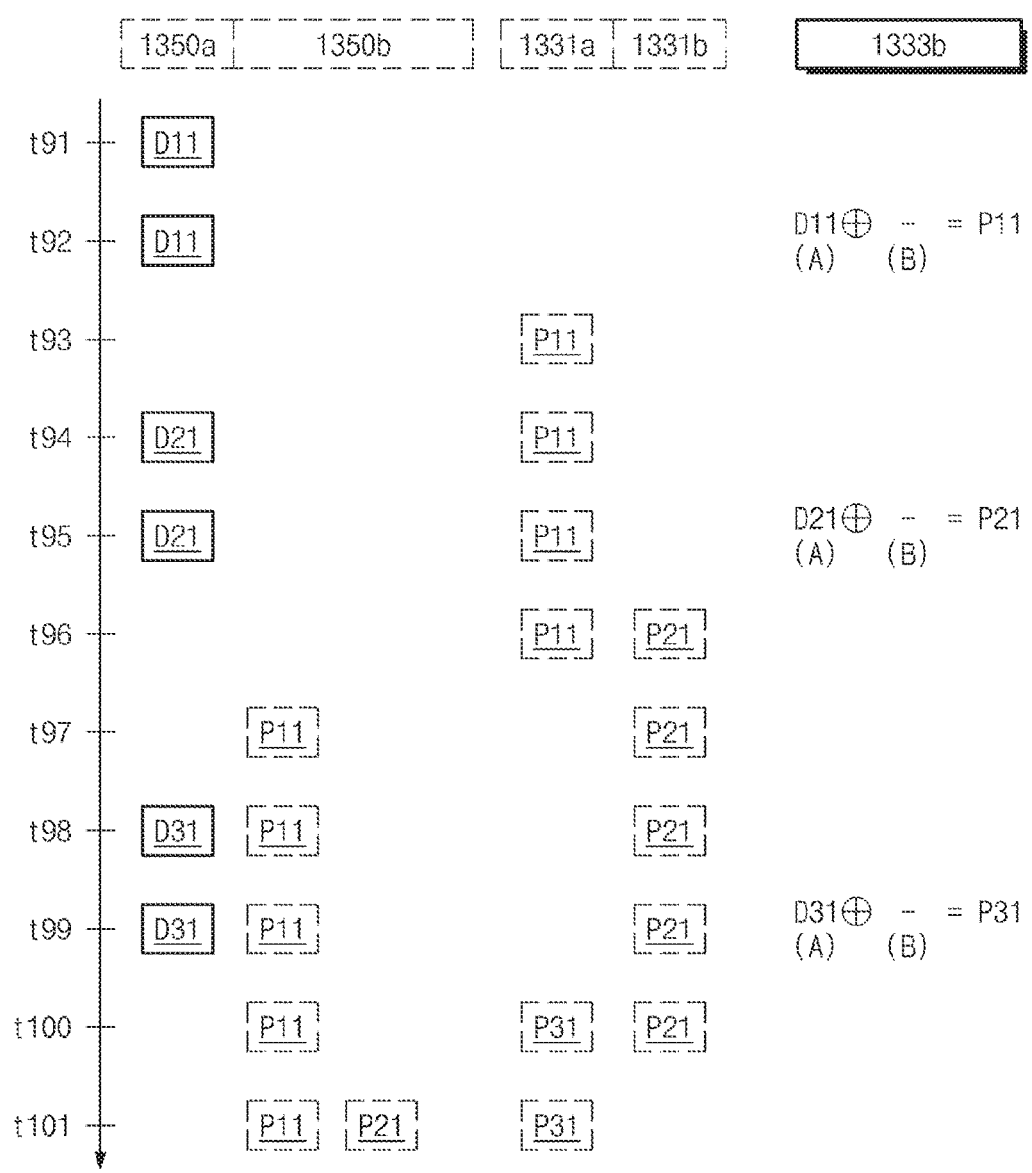
Figure 12B:
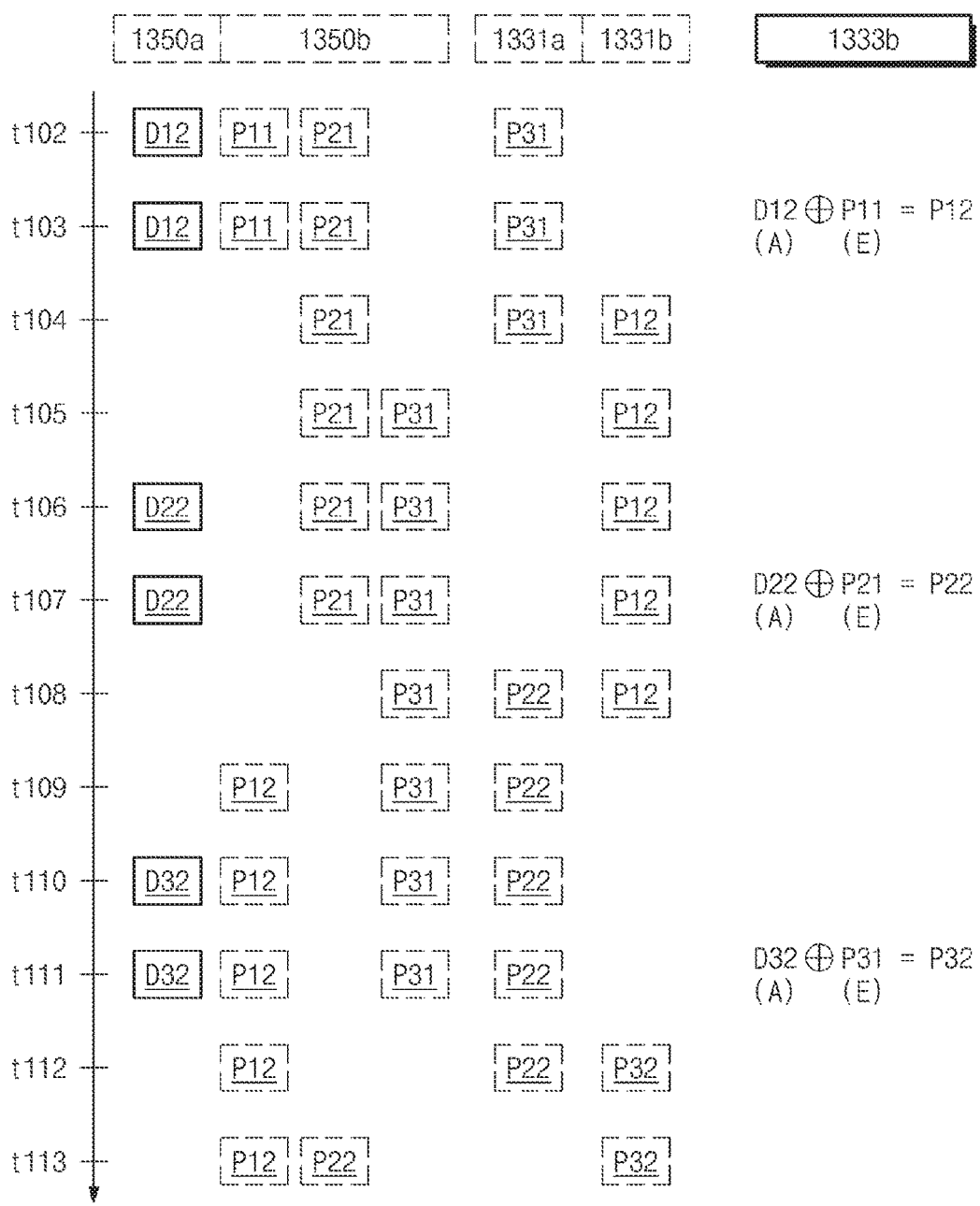

FIG. 11 is a block diagram illustrating a configuration of the storage device of FIG. 1 using RAID according to an exemplary embodiment of the inventive concept. FIGS. 12A to 12C are diagrams for describing a process of storing data in the storage device of FIG. 11 according to an exemplary embodiment of the inventive concept.

Referring to FIG. 11, according to an exemplary embodiment of the inventive concept, the storage device 1300 of FIG. 1 may include a storage device 1300d illustrated in FIG. 11. The storage device 1300d may include components which are similar to those of the storage device 1300b of FIG. 5. However, in the example of FIGS. 11 to 12C, the parity area 1350b of the buffer memory 1350 may be further connected to the parity operator 1333b along a route E.

In the example of FIGS. 11 to 12C, the RAID manager 1333a may receive the plurality of data D1, D2, and D3. The RAID manager 1333a may divide the data D1 into data chunks D11, D12, and D13, may divide the data D2 into data chunks D21, D22, and D23, and may divide the data D3 into data chunks D31, D32, and D33, on the basis of RAID parameter(s). In the example of FIGS. 11 to 12C, the data chunks D11, D12, D13, D21, D22, D23, D31, D32, and D33 may be sequentially processed in the order of the data chunk D11, the data chunk D21, the data chunk D31, the data chunk D12, the data chunk D22, the data chunk D32, the data chunk D13, the data chunk D23, and the data chunk D33.

Referring to FIG. 12A together with FIG. 11, at time t91, the data chunk D11 may be buffered in the data area 1350a of the buffer memory 1350. At time t92, the parity operator 1333b may receive the data chunk D11 along the route A. Intermediate parity associated with the data chunk D11 is not generated yet, and the parity operator 1333b may generate intermediate parity P11 associated with the data D1 based on the data chunk D11. At time t93, the intermediate parity P11 may be stored in the parity area 1331a, and the data chunk D11 may be output to the nonvolatile memories 1310.

At time t94, the data chunk D21 may be buffered in the data area 1350a. At time t95, the parity operator 1333b may receive the data chunk D21 along the route A, and may generate intermediate parity P21 associated with the data D2 based on the data chunk D21. At time t96, the intermediate parity P21 may be stored in the empty parity area 1331b, and the data chunk D21 may be output to the nonvolatile memories 1310.

Meanwhile, since all the parity areas 1331a and 1331b have become full, the intermediate parity P11 may be output from the cache memory 1331 to the buffer memory 1350 in response to a request from the RAID engine 1333. Thus, at time t97, the intermediate parity P11 may be buffered in the parity area 1350b of the buffer memory 1350, and the empty parity area 1331a may be secured in the cache memory 1331. FIG. 12A illustrates that the parity area 1331a becomes empty before the data chunk D31 is received. However, according to exemplary embodiments of the inventive concept, the parity area 1331a may become empty after the data chunk D31 is received.

At time t98, the data chunk D31 may be buffered in the data area 1350a. At time t99, the parity operator 1333b may receive the data chunk D31 along the route A, and may generate intermediate parity P31 associated with the data D3 based on the data chunk 31.

At time t100, the intermediate parity P31 may be stored in the empty parity area 1331a, and the data chunk D31 may be output to the nonvolatile memories 1310. Meanwhile, in response to a request from the RAID engine 1333, the intermediate parity P21 may be output from the cache memory 1331 to the buffer memory 1350. Thus, at time t101, the intermediate parity P21 may be buffered in the parity area 1350b, and the empty parity area 1331b may be secured in the cache memory 1331.

Referring to FIG. 12B together with FIG. 11, at time t102, the data chunk D12 may be buffered in the data area 1350a. At time t103, the parity operator 1333b may receive the data chunk D12 along the route A. Meanwhile, the RAID engine 1333 may determine, based on meta-information, that the intermediate parity P11 associated with the data D1 is not in the cache memory 1331 but is buffered in the buffer memory 1350. In this case, in response to a request from the RAID engine 1333, the parity operator 1333b may further receive the intermediate parity P11 from the buffer memory 1350 along the route E.

The parity operator 1333b may generate intermediate parity P12 based on the data chunk D12 and the intermediate parity P11. At time t104, the intermediate parity P12 may be stored in the empty parity area 1331b, and the data chunk D12 may be output to the nonvolatile memories 1310. In other words, the parity operator 1333b may receive the intermediate parity P11 along the route E, instead of loading the intermediate parity P11 into the cache memory 1331, generating the intermediate parity P12 by the parity operator 1333b, and outputting the intermediate parity P12 to the buffer memory 1350. Herein, the intermediate parity P11 may not be stored in the cache memory 1331, and may be immediately loaded into the parity operator 1333b.

According to the present exemplary embodiment, intermediate parity may not be lost while omitting a process of loading intermediate parity, buffered in the buffer memory 1350, into the cache memory 1331. As some of the processes of loading and storing data between different memories are omitted, latency may decrease and performance of the storage device 1300d may be increased.

Meanwhile, in response to a request from the RAID engine 1333, the intermediate parity P31 may be output from the cache memory 1331 to the buffer memory 1350. Thus, at time t105, the intermediate parity P31 may be buffered in the parity area 1350b, and the empty parity area 1331a may be secured in the cache memory 1331.

Similarly, from time t106 to time t109, the parity operator 1333b may receive the data chunk D22 along the route A, and may receive the intermediate parity P21 from the buffer memory 1350 along the route E. Herein, the intermediate parity P21 may not be stored in the cache memory 1331 but may be loaded into the parity operator 1333b. The parity operator 1333b may generate intermediate parity P22 based on the data chunk D22 and the intermediate parity P21, and the intermediate parity P22 may be stored in the empty parity area 1331a. In response to a request from the RAID engine 1333, the intermediate parity P12 may be buffered in the parity area 1350b.

From time t110 to time t113, the parity operator 1333b may receive the data chunk D32 along the route A, and may receive the intermediate parity P31 from the buffer memory 1350 along the route E. Herein, the intermediate parity P31 may not be stored in the cache memory 1331 but may be loaded into the parity operator 1333b. The parity operator 1333b may generate intermediate parity P32 based on the data chunk D32 and the intermediate parity P31, and the intermediate parity P32 may be stored in the empty parity area 1331b. In response to a request from the RAID engine 1333, the intermediate parity P22 may be buffered in the parity area 1350b.

Referring to FIG. 12C together with FIG. 11, at time t114, the data chunk D13 may be buffered in the data area 1350a. At time t115, the parity operator 1333b may receive the data chunk D13 along the route A, and may receive the intermediate parity P12 from the buffer memory 1350 along the route E. Herein, the intermediate parity P12 may not be stored in the cache memory 1331 but may be loaded into the parity operator 1333b. The parity operator 1333b may generate intermediate parity P13 based on the data chunk D13 and the intermediate parity P12.

At time t116, the parity P13 may be stored in the empty parity area 1331b. Meanwhile, the RAID engine 1333 may determine, based on meta- or header information, that the data chunk D13 is a data chunk which is processed last in connection with the data D1. In this case, at time t117, the parity P13 may be output to the nonvolatile memories 1310 as final parity, in response to a request from the RAID engine 1333. Thus, the nonvolatile memories 1310 may distributively store the data chunks D11, D12, and D13 and the final parity P13 in connection with the data D1.

Similarly, from time t118 to time t121, the parity operator 1333b may receive the data chunk D23 along the route A, and may receive the intermediate parity P22 from the buffer memory 1350 along the route E. The parity operator 1333b may generate parity P23 based on the data chunk D23 and the intermediate parity P22. The parity P23 may be output to the nonvolatile memories 1310 as final parity, in response to a request from the RAID engine 1333. Thus, the nonvolatile memories 1310 may distributively store the data chunks D21, D22, and D23 and the final parity P23 in connection with the data D2.

At time t122, the data chunk D33 may be buffered in the data area 1350a. At time t123, the parity operator 1333b may receive the data chunk D33 along the route A. Meanwhile, since intermediate parity P32 is stored in the parity area 1331b, the parity operator 1333b may receive the intermediate parity P32 from the cache memory 1331 along the route B. The parity operator 1333b may generate parity P33 based on the data chunk D33 and the intermediate parity P32. At time t124, the parity P33 may be stored (or updated) in the parity area 1331b.

At time t125, the parity P33 may be output to the nonvolatile memories 1310 as final parity, in response to a request from the RAID engine 1333. Thus, the nonvolatile memories 1310 may distributively store the data chunks D31, D32, and D33 and the final parity P33 in connection with the data D3.

Figure 13:
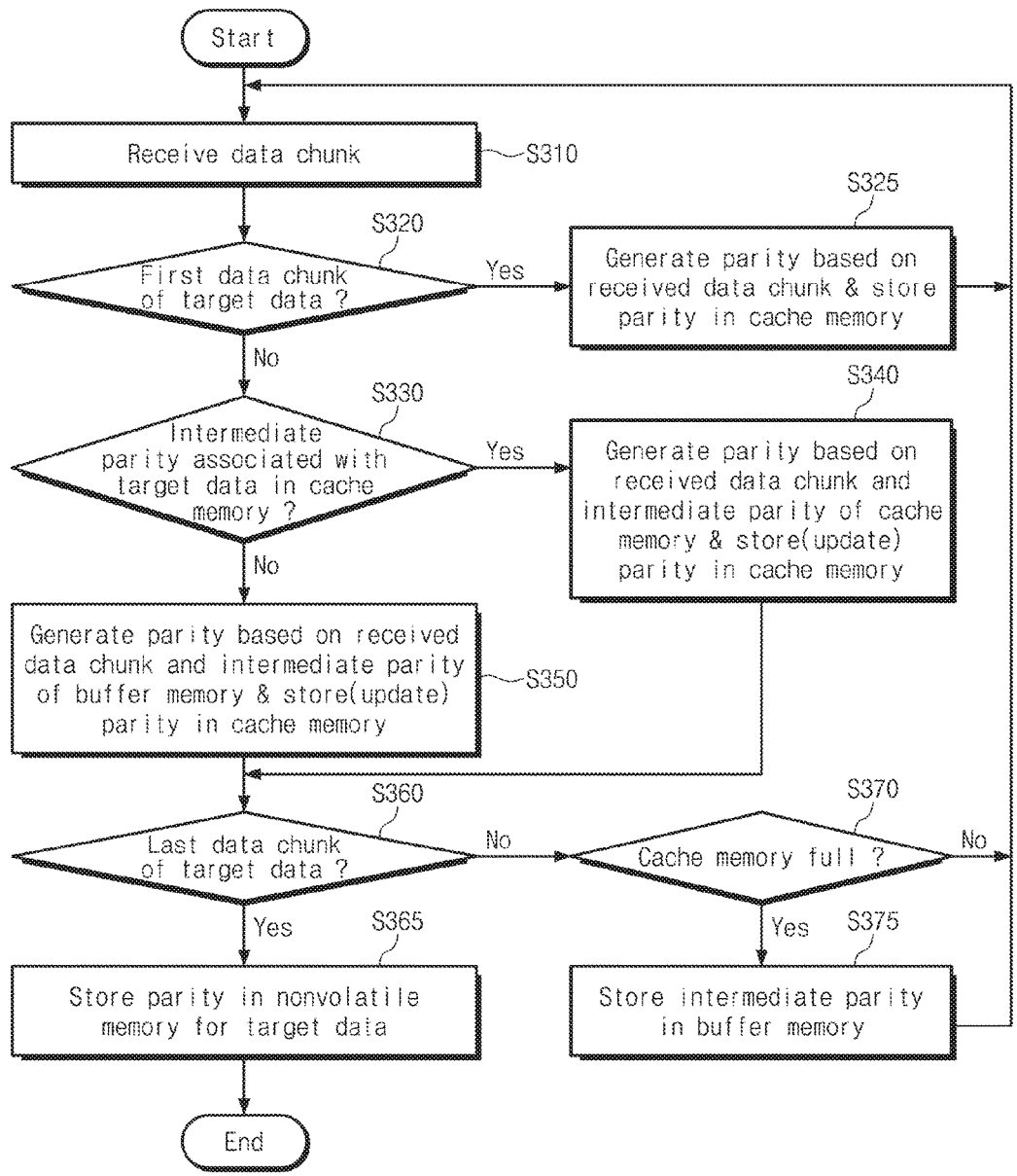
FIG. 13 is a flowchart describing a process of storing data in the storage device of FIG. 11 according to an exemplary embodiment of the inventive concept.

FIG. 13 is a flowchart describing a process of storing data in the storage device of FIG. 11 according to an exemplary embodiment of the inventive concept.

In operation S310, a data chunk divided from target data may be received and buffered in the data area 1350a of the buffer memory 1350. In operation S320, the RAID engine 1333 may determine, based on meta- or header information of the received data chunk, whether the received data chunk is a data chunk which is processed first in connection with the target data.

When the received data chunk is processed first in connection with the target data, intermediate parity may not be generated yet. Thus, in operation S325, the parity operator 1333b may generate intermediate parity based on the received data chunk, and the generated intermediate parity may be stored in an empty parity area of the cache memory 1331. Afterwards, in operation S310, a next data chunk may be received.

On the other hand, when the received data chunk is not a first processed data chunk, operation S330 may be performed. In operation S330, the RAID engine 1333 may determine, based on meta-information managed by the RAID engine 1333, whether intermediate parity is stored in the cache memory 1331.

When the intermediate parity exists in the cache memory 1331, operation S340 may be performed. In operation S340, the parity operator 1333b may generate a next parity, based on the data chunk received along the route A and the intermediate parity received from the cache memory 1331 along the route B (e.g., operations at time t123 of FIG. 12C). This parity may be stored (or updated) in a parity area of the cache memory 1331.

On the other hand, when the intermediate parity does not exist in the cache memory 1331 (e.g., when the intermediate parity is buffered in the buffer memory 1350), operation S350 may be performed. In operation S350, the parity operator 1333b may generate the next parity, based on the data chunk received along the route A and the intermediate parity received from the buffer memory 1350 along the route E (e.g., operations at time t103 of FIG. 12B). Herein, the intermediate parity of the buffer memory 1350 may not be stored in the cache memory 1331 but may be loaded into the parity operator 1333b. Thus, latency may be prevented from increasing. The generated parity may be stored in an empty parity area of the cache memory 1331.

When the parity is generated in operation S340 or S350, in operation S360, the RAID engine 1333 may determine, based on meta- or header information of the received data chunk, whether the received data chunk is a data chunk which is processed last in connection with the target data. When the received data chunk is a last processed data chunk, operation S365 may be performed. In operation S365, the generated parity may be stored in the nonvolatile memories 1310 as final parity associated with the target data.

On the other hand, when the received data chunk is not the last processed data chunk, operation S370 may be performed. In operation S370, the RAID engine 1333 may determine, based on the meta-information managed by the RAID engine 1333, whether a remaining capacity of a memory area allocated for final parity and intermediate parity in the cache memory 1331 is less than a reference capacity (e.g., all the parity areas of the cache memory 1331 are full).

When the remaining capacity is greater than or equal to the reference capacity (e.g., some of parity areas of the cache memory 1331 are still empty), in operation S310, a next data chunk may be received.

When the remaining capacity is less than the reference capacity, operation S375 may be performed. In operation S375, in response to a request from the RAID engine 1333, the intermediate parity of the cache memory 1331 may be output to and buffered in the buffer memory 1350 (e.g., operations at time t104 and time t105 of FIG. 12B). Thus, an empty parity area of the cache memory 1331 may be secured. Afterwards, in operation S310, a next data chunk may be received.

Each of the routes A, B, C, D, and E described with reference to FIGS. 3 to 13 may include a conductive pattern for connecting components. For example, the conductive pattern may be a conductive material formed on a printed circuit board (PCB). The conductive pattern may include a wire pattern, a trace pattern, and/or the like. The conductive material may be implemented by a wire, a trace, a conductive plate, and/or the like. However, the inventive concept is not limited thereto.

Figure 14:
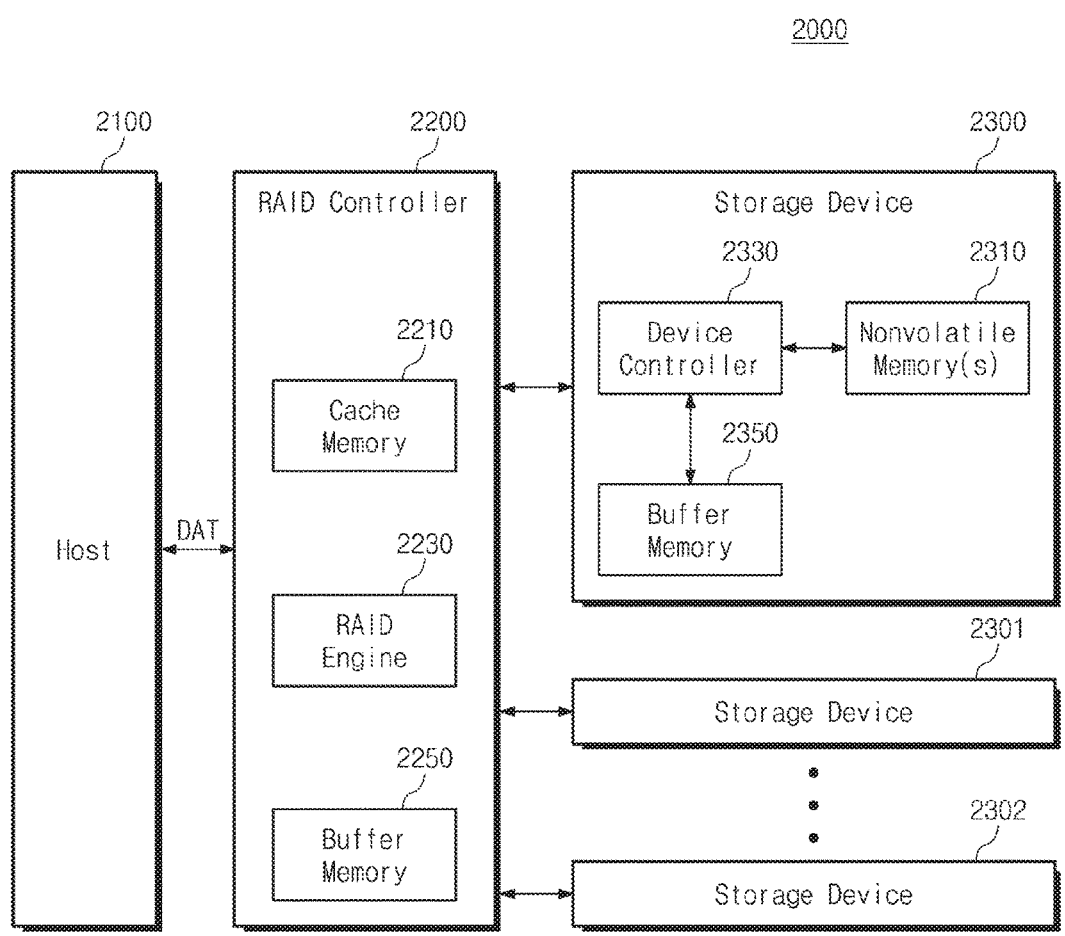
FIG. 14 is a block diagram illustrating an electronic system including a RAID controller and storage devices according to an exemplary embodiment of the inventive concept.

FIG. 14 is a block diagram illustrating an electronic system including a RAID controller and storage devices according to an exemplary embodiment of the inventive concept. An electronic system 2000 may include a host 2100, a RAID controller 2200, and a plurality of storage devices 2300, 2301, and 2302.

The host 2100 may correspond to the host 1100 of FIG. 1. The RAID controller 2200 may manage the storage devices 2300, 2301, and 2302 using RAID. The RAID controller 2200 may manage data DAT exchanged with the host 2100 in units of stripes. According to an operation of the RAID controller 2200, the storage devices 2300, 2301, and 2302 may distributively store a plurality of data chunks and parity associated with each stripe.

The storage device 2300 may include nonvolatile memories 2310, a device controller 2330, and a buffer memory 2350. The nonvolatile memories 2310, the device controller 2330, and the buffer memory 2350 may correspond to the nonvolatile memories 1310, the controller 1330, and the buffer memory 1350, respectively, of the storage device 1300 of FIG. 1. However, the device controller 2330 may not include the RAID engine 1333. Each of the storage devices 2301 and 2302 may be configured identically or similarly to the storage device 2300.

The RAID controller 2200 may be implemented by an electronic device separate from the storage devices 2300, 2301, and 2302. The RAID controller 2200 may be implemented by a general-purpose electronic device such as a computing device or a special-purpose electronic device/circuit that is configured to process a RAID storage scheme.

The RAID controller 2200 may include a cache memory 2210, a RAID engine 2230, and a buffer memory 2250. The cache memory 2210 and the buffer memory 2250 may store/buffer data used in an operation of the RAID controller 2200. The RAID engine 2230 may perform a variety of operations to manage the storage devices 2300, 2301, and 2302 using RAID.

The RAID engine 2230 may employ one or more configurations described above with reference to FIGS. 2 to 13. For example, the RAID engine 2230 may reduce latency in generating final parity by employing the additional parity operator 1333*c* of FIG. 8 or by including the route E of FIG. 11. In other words, exemplary embodiments of the inventive concept described above may be employed in not only the single storage device 1300 but also in the electronic system 2000 including the storage devices 2300, 2301, and 2302 that uses RAID.

As described above, according to exemplary embodiments of the inventive concept, some of the processes for loading and storing data between different memories may be omitted while final parity is generated. Thus, latency when generating parity may decrease, and performance of a storage device may increase.

While the inventive concept has been shown and described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A storage device comprising:
a plurality of first memories configured to distributively store first and second data chunks associated with target data;
a controller configured to control the plurality of first memories such that the first and second data chunks are distributively stored; and
a buffer memory configured to buffer the first and second data chunks,
wherein the controller is further configured to generate a first intermediate parity using the first data chunk, which is processed immediately before the second data chunk in connection with the target data,
wherein when the second data chunk is not a data chunk which is processed last in connection with the target data and the first intermediate parity is buffered in the buffer memory, the controller is further configured to,
generate a second intermediate parity using the buffered first intermediate parity and the second data chunk, and
output the second intermediate parity to the buffer memory to be buffered,
wherein the controller comprises a cache memory, and
wherein when the cache memory stores the second data chunk and a remaining capacity of a memory area allocated for final parity and intermediate parity in the cache memory is greater than or equal to a reference capacity, the controller does not generate the second intermediate parity and stores the second data chunk in the cache memory.

2. The storage device of claim 1, wherein the controller comprises:
a first parity operator configured to generate the first intermediate parity using at least the first data chunk; and
a second parity operator configured to generate the second intermediate parity using the buffered first intermediate parity and the second data chunk.

3. The storage device of claim 2, wherein an output from the first parity operator is stored in the cache memory inside the controller, and
wherein an output from the second parity operator is buffered in the buffer memory, without being stored in the cache memory.

4. The storage device of claim 1, wherein when the cache memory stores the second data chunk and the remaining capacity becomes less than the reference capacity, the controller is further configured to generate the second intermediate parity and to output the second intermediate parity to the buffer memory.

5. The storage device of claim 1, wherein when the second data chunk is a data chunk which is processed last in connection with the target data and the first intermediate parity is buffered in the buffer memory, the controller is further configured to generate a final parity associated with the first and second data chunks, using the buffered first intermediate parity and the second data chunk.

6. The storage device of claim 5, wherein the controller comprises a parity operator configured to:
generate the first intermediate parity using at least the first data chunk, and
generate the final parity using the buffered first intermediate parity and the second data chunk.

7. The storage device of claim 5, wherein the controller is further configured to store the final parity in the cache memory inside the controller.

8. The storage device of claim 7, wherein the controller is further configured to output the final parity in the cache memory to the plurality of first memories, and
wherein the plurality of first memories is further configured to distributively store the first and second data chunks and the final parity in connection with the target data.

9. A storage device comprising:
a plurality of first memories configured to distributively store first and second data chunks associated with target data;
a controller configured to control the plurality of first memories such that the first and second data chunks are distributively stored; and
a buffer memory configured to buffer the first and second data chunks,
wherein the controller is further configured to generate a first intermediate parity using the first data chunk, which is processed immediately before the second data chunk in connection with the target data,
wherein when the first intermediate parity is buffered in the buffer memory, the controller is further configured to generate a second intermediate parity using the buffered first intermediate parity and the second data chunk,
wherein the controller comprises a cache memory, and
wherein when the cache memory stores the second data chunk and a remaining capacity of a memory area allocated for final parity and intermediate parity in the cache memory is greater than or equal to a reference capacity, the controller does not generate the second intermediate parity and stores the second data chunk in the cache memory.

10. The storage device of claim 9, wherein the controller comprises a parity operator configured to:
generate the first intermediate parity using at least the first data chunk and,
generate the second intermediate parity using the buffered first intermediate parity and the second data chunk.

11. The storage device of claim 10, wherein an output from the parity operator is stored in the cache memory inside the controller, and wherein an output from the buffer memory is loaded into the parity operator, without being stored in the cache memory.

12. The storage device of claim 9, wherein when the cache memory stores the first intermediate parity and the remaining capacity is less than the reference capacity, the controller is further configured to output the first intermediate parity to the buffer memory to be buffered.

13. The storage device of claim 9, wherein when the first intermediate parity is stored in the cache memory inside the controller, the controller is further configured to generate the second intermediate parity using the first intermediate parity in the cache memory and the second data chunk.

14. The storage device of claim 9, wherein when the second data chunk is a data chunk which is processed last in connection with the target data, the controller is further configured to output the second intermediate parity as a final parity associated with the first and second data chunks, to the plurality of first memories, and wherein the plurality of first memories is further configured to distributively store the first and second data chunks and the final parity in connection with the target data.

15. A method of storing data, the method comprising:

receiving a first data chunk divided from first target data;

determining that the first data chunk is not a first processed data chunk in connection with the first target data;

determining whether a first intermediate parity associated with the first target data is stored in a cache memory;

generating a first parity using the received first data chunk and the first intermediate parity from the cache memory when it is determined that the first intermediate parity is stored in the cache memory; and generating the first parity using the received first data chunk and a second intermediate parity associated with the first target data and buffered in a buffer memory, without loading the second intermediate parity from the buffer memory into the cache memory, when it is determined that the first intermediate parity is not stored in the cache memory, wherein generating the first parity using the received first data chunk and the second intermediate parity comprises:

determining whether the first data chunk is a last processed data chunk in connection with the first target data;

generating the first parity using the received first data chunk and the second intermediate parity buffered in the buffer memory, when it is determined that the first data chunk is the last processed data chunk;

storing the received first data chunk in the cache memory when it is determined that the first data chunk is not the last processed data chunk;

after storing the received first data chunk in the cache memory, receiving a second data chunk divided from second target data;

determining that the cache memory is full in response to the received second data chunk being stored in the cache memory;

generating the first parity using the received first data chunk and the second intermediate parity buffered in the buffer memory; and storing the generated first parity in the buffer memory, without storing the generated first parity in the cache memory.

16. The method of claim 15, further comprising:

after storing the received first data chunk in the cache memory, determining that the cache memory is full;

generating a second parity not associated with the first target data using data stored in the cache memory and the buffer memory; and storing the generated second parity in the buffer memory.

17. The method of claim 15, further comprising:

determining that the first data chunk is the last processed data chunk in connection with the first target data; and storing the generated first parity in a nonvolatile memory with the first data chunk.

* * * * *